(12) United States Patent
Miller, II et al.

(10) Patent No.: US 12,392,680 B2
(45) Date of Patent: Aug. 19, 2025

(54) SPECTRAL FITTING OF COMPACT LASER-BASED TRACE GAS SENSOR MEASUREMENTS FOR HIGH DYNAMIC RANGE (HDR)

(71) Applicant: SeekOps Inc., Austin, TX (US)

(72) Inventors: Victor Alexander Miller, II, Sonoma, CA (US); Brendan James Smith, Lakeway, TX (US); Stuart Buckingham, Austin, TX (US)

(73) Assignee: SeekOps Inc., Austin, TX (US)

( * ) Notice: Subject to any disclaimer, the term of this patent is extended or adjusted under 35 U.S.C. 154(b) by 406 days.

(21) Appl. No.: 17/761,734

(22) PCT Filed: Sep. 19, 2020

(86) PCT No.: PCT/US2020/051696
§ 371 (c)(1),
(2) Date: Mar. 18, 2022

(87) PCT Pub. No.: WO2021/055902
PCT Pub. Date: Mar. 25, 2021

(65) Prior Publication Data
US 2022/0341806 A1    Oct. 27, 2022

Related U.S. Application Data

(60) Provisional application No. 62/903,443, filed on Sep. 20, 2019.

(51) Int. Cl.
*G01M 3/20*    (2006.01)

(52) U.S. Cl.
CPC .................................. *G01M 3/20* (2013.01)

(58) Field of Classification Search
None
See application file for complete search history.

(56) References Cited

U.S. PATENT DOCUMENTS 3,780,566 A    12/1973    Smith et al.
4,135,092 A    1/1979    Milly
(Continued)

FOREIGN PATENT DOCUMENTS

AU    3401499 A    11/1999
CN    101470072 A    7/2009
(Continued)

OTHER PUBLICATIONS

Lilian Joly et al. Atmospheric Measurements by Ultra-Light Spectrometer (AMULSE) Dedicated to Vertical Profile in Situ Measurements of Carbon Dioxide (CO2) Under Weather Balloons: Instrumental Development and Field Application. Sensors 2016, 16, 1609. https://doi.org/10.3390/s16101609 (Year: 2016).*
(Continued)

*Primary Examiner* — Matthew G Marini
(74) *Attorney, Agent, or Firm* — Command IP LLP; Michael Zarrabian

(57) ABSTRACT

Systems, devices, and methods for scanning a laser into wings of an absorption feature; fitting a polynomial to the edges of the scan; dividing a transmitted signal by a fit-derived baseline to compute a transmission of the light; fitting a spectral model with the transmitted signal; and solving for a mole fraction.

20 Claims, 11 Drawing Sheets

(56) References Cited

U.S. PATENT DOCUMENTS

| | | | |
|---|---|---|---|
| 4,233,564 A | 11/1980 | Kerbel | |
| 4,507,558 A | 3/1985 | Bonne | |
| 4,651,010 A | 3/1987 | Javan | |
| 4,988,833 A | 1/1991 | Lai | |
| 5,047,639 A | 9/1991 | Wong | |
| 5,075,619 A | 12/1991 | Said | |
| 5,173,749 A | 12/1992 | Tell et al. | |
| 5,291,265 A | 3/1994 | Kebabian | |
| 5,317,156 A | 5/1994 | Cooper et al. | |
| 5,767,780 A | 6/1998 | Smith et al. | |
| 5,822,058 A * | 10/1998 | Adler-Golden | G01N 33/0047 |
| | | | 356/302 |
| 6,064,488 A | 5/2000 | Brand et al. | |
| 6,295,859 B1 | 10/2001 | Hayden et al. | |
| 6,356,350 B1 | 3/2002 | Silver et al. | |
| 6,509,566 B1 | 1/2003 | Wamsley et al. | |
| 6,549,630 B1 | 4/2003 | Bobisuthi | |
| 7,162,933 B2 | 1/2007 | Thompson et al. | |
| 7,800,751 B1 | 9/2010 | Silver et al. | |
| 7,833,480 B2 | 11/2010 | Blazewicz et al. | |
| 8,060,270 B2 | 11/2011 | Vian et al. | |
| 8,294,899 B2 | 10/2012 | Wong | |
| 8,451,120 B2 | 5/2013 | Johnson, Jr. et al. | |
| 8,730,461 B2 | 5/2014 | Andreussi | |
| 9,183,371 B2 | 11/2015 | Narendra et al. | |
| 9,183,731 B1 | 11/2015 | Bokhary | |
| 9,235,974 B2 | 1/2016 | Johnson, Jr. et al. | |
| 9,250,175 B1 | 2/2016 | McManus | |
| 9,494,511 B2 | 11/2016 | Wilkins | |
| 9,599,529 B1 | 3/2017 | Steele et al. | |
| 9,599,597 B1 | 3/2017 | Steele et al. | |
| 10,023,311 B2 | 7/2018 | Lai et al. | |
| 10,023,323 B1 | 7/2018 | Roberts et al. | |
| 10,031,040 B1 | 7/2018 | Smith et al. | |
| 10,126,200 B1 | 11/2018 | Steele et al. | |
| 10,268,198 B2 | 4/2019 | Mantripragada et al. | |
| 10,325,485 B1 | 6/2019 | Schuster | |
| 10,365,646 B1 | 7/2019 | Farnsworth et al. | |
| 10,429,546 B1 | 10/2019 | Ulmer | |
| 10,677,771 B2 | 6/2020 | Dittberner et al. | |
| 10,753,864 B2 | 8/2020 | Kasten et al. | |
| 10,816,458 B2 | 10/2020 | Kasten et al. | |
| 10,830,034 B2 | 11/2020 | Cooley et al. | |
| 10,962,437 B1 | 3/2021 | Nottrott et al. | |
| 11,105,784 B2 | 8/2021 | Kukreja et al. | |
| 11,112,308 B2 | 9/2021 | Kreitinger et al. | |
| 11,275,068 B2 | 3/2022 | Willett | |
| 11,299,268 B2 | 4/2022 | Christensen et al. | |
| 11,519,855 B2 | 12/2022 | Black et al. | |
| 11,557,212 B2 | 1/2023 | Hong | |
| 11,614,430 B2 | 3/2023 | Buckingham et al. | |
| 11,619,562 B2 | 4/2023 | Leen et al. | |
| 11,710,411 B2 | 7/2023 | Van Meeteren et al. | |
| 11,748,866 B2 | 9/2023 | Vargas | |
| 12,015,386 B2 | 6/2024 | Gatabi et al. | |
| 2002/0005955 A1 | 1/2002 | Kramer et al. | |
| 2003/0160174 A1 | 8/2003 | Grant et al. | |
| 2003/0189711 A1 | 10/2003 | Orr et al. | |
| 2003/0230716 A1 | 12/2003 | Russell et al. | |
| 2004/0012787 A1 | 1/2004 | Galle et al. | |
| 2004/0017762 A1 | 1/2004 | Sogawa et al. | |
| 2004/0212804 A1 | 10/2004 | Neff et al. | |
| 2006/0015290 A1 * | 1/2006 | Warburton | G01T 1/17 |
| | | | 702/178 |
| 2006/0044562 A1 | 3/2006 | Hagene et al. | |
| 2006/0232772 A1 | 10/2006 | Silver | |
| 2006/0234621 A1 | 10/2006 | Desrochers et al. | |
| 2007/0137318 A1 | 6/2007 | Desrochers et al. | |
| 2008/0169934 A1 | 7/2008 | Lang et al. | |
| 2008/0243372 A1 | 10/2008 | Bodin et al. | |
| 2009/0201507 A1 | 8/2009 | Kluczynski et al. | |
| 2009/0263286 A1 | 10/2009 | Somura et al. | |
| 2009/0326792 A1 | 12/2009 | McGrath | |
| 2010/0004798 A1 | 1/2010 | Bodin et al. | |
| 2010/0131207 A1 | 5/2010 | Lippert et al. | |
| 2010/0140478 A1 | 6/2010 | Wilson et al. | |
| 2010/0147081 A1 | 6/2010 | Thomas | |
| 2011/0035149 A1 | 2/2011 | McAndrew et al. | |
| 2011/0074476 A1 | 3/2011 | Heer et al. | |
| 2011/0150035 A1 * | 6/2011 | Hanson | G01K 13/02 |
| | | | 374/161 |
| 2011/0164251 A1 | 7/2011 | Richter | |
| 2011/0213554 A1 | 9/2011 | Archibald et al. | |
| 2011/0242659 A1 | 10/2011 | Eckles et al. | |
| 2011/0257944 A1 | 10/2011 | Du et al. | |
| 2012/0120397 A1 | 5/2012 | Furtaw et al. | |
| 2013/0044314 A1 | 2/2013 | Koulikov et al. | |
| 2013/0061692 A1 | 3/2013 | Muresan et al. | |
| 2013/0076900 A1 | 3/2013 | Mrozek et al. | |
| 2013/0208262 A1 | 8/2013 | Andreussi | |
| 2014/0172323 A1 | 6/2014 | Marino | |
| 2014/0204382 A1 | 7/2014 | Christensen | |
| 2014/0236390 A1 | 8/2014 | Mohamadi | |
| 2014/0336957 A1 | 11/2014 | Hanson et al. | |
| 2015/0039256 A1 | 2/2015 | Michalske | |
| 2015/0072633 A1 | 3/2015 | Massarella et al. | |
| 2015/0145954 A1 | 5/2015 | Pulleti et al. | |
| 2015/0226575 A1 | 8/2015 | Rambo | |
| 2015/0275114 A1 | 10/2015 | Tumiatti et al. | |
| 2015/0295543 A1 | 10/2015 | Brown et al. | |
| 2015/0316473 A1 | 11/2015 | Kester et al. | |
| 2015/0323449 A1 | 11/2015 | Jones et al. | |
| 2015/0336667 A1 | 11/2015 | Srivastava et al. | |
| 2016/0018373 A1 | 1/2016 | Page et al. | |
| 2016/0070265 A1 | 3/2016 | Liu et al. | |
| 2016/0104250 A1 | 4/2016 | Allen et al. | |
| 2016/0146696 A1 | 5/2016 | Steele et al. | |
| 2016/0161456 A1 | 6/2016 | Risk et al. | |
| 2016/0202225 A1 | 7/2016 | Feng et al. | |
| 2016/0214715 A1 | 7/2016 | Meffert | |
| 2016/0216172 A1 | 7/2016 | Rella et al. | |
| 2016/0307447 A1 | 10/2016 | Johnson et al. | |
| 2016/0357192 A1 | 12/2016 | McGrew et al. | |
| 2017/0003684 A1 | 1/2017 | Knudsen | |
| 2017/0057081 A1 | 3/2017 | Krohne et al. | |
| 2017/0089829 A1 | 3/2017 | Bartholomew et al. | |
| 2017/0093122 A1 | 3/2017 | Bean et al. | |
| 2017/0097274 A1 | 4/2017 | Thorpe et al. | |
| 2017/0115218 A1 | 4/2017 | Huang et al. | |
| 2017/0134497 A1 | 5/2017 | Harter et al. | |
| 2017/0158353 A1 | 6/2017 | Schmick | |
| 2017/0199647 A1 | 7/2017 | Richman et al. | |
| 2017/0206648 A1 | 7/2017 | Marra et al. | |
| 2017/0235018 A1 | 8/2017 | Foster et al. | |
| 2017/0259920 A1 | 9/2017 | Lai et al. | |
| 2017/0290034 A1 | 10/2017 | Desai et al. | |
| 2017/0307519 A1 | 10/2017 | Black et al. | |
| 2017/0336281 A1 | 11/2017 | Waxman et al. | |
| 2017/0339820 A1 | 11/2017 | Foster et al. | |
| 2018/0023974 A1 | 1/2018 | Otani et al. | |
| 2018/0024091 A1 | 1/2018 | Wang et al. | |
| 2018/0045561 A1 | 2/2018 | Leen et al. | |
| 2018/0045596 A1 | 2/2018 | Prasad et al. | |
| 2018/0050798 A1 | 2/2018 | Kapuria | |
| 2018/0059003 A1 | 3/2018 | Jourdainne | |
| 2018/0067066 A1 | 3/2018 | Giedd et al. | |
| 2018/0095478 A1 | 4/2018 | van Cruyningen | |
| 2018/0109767 A1 | 4/2018 | Li et al. | |
| 2018/0122246 A1 | 5/2018 | Clark | |
| 2018/0127093 A1 | 5/2018 | Christensen et al. | |
| 2018/0188129 A1 | 7/2018 | Choudhury et al. | |
| 2018/0209902 A1 | 7/2018 | Myshak et al. | |
| 2018/0259955 A1 | 9/2018 | Noto | |
| 2018/0266241 A1 | 9/2018 | Ferguson et al. | |
| 2018/0266946 A1 | 9/2018 | Kotidis et al. | |
| 2018/0284088 A1 | 10/2018 | Verbeck, IV | |
| 2018/0292374 A1 | 10/2018 | Dittberner et al. | |
| 2018/0321692 A1 | 11/2018 | Castillo-Effen et al. | |
| 2018/0322699 A1 | 11/2018 | Gray et al. | |
| 2019/0011920 A1 | 1/2019 | Heinonen et al. | |
| 2019/0011935 A1 | 1/2019 | Ham et al. | |
| 2019/0025199 A1 | 1/2019 | Koulikov | |
| 2019/0033194 A1 | 1/2019 | DeFreez et al. | |
| 2019/0049364 A1 | 2/2019 | Rubin | |

(56) References Cited

U.S. PATENT DOCUMENTS

| | | |
|---|---|---|
| 2019/0066479 A1 | 2/2019 | Wesley et al. |
| 2019/0077506 A1 | 3/2019 | Shaw et al. |
| 2019/0086202 A1 | 3/2019 | Guan et al. |
| 2019/0095687 A1 | 3/2019 | Shaw et al. |
| 2019/0154874 A1 | 5/2019 | Shams et al. |
| 2019/0178743 A1 | 6/2019 | McNeil |
| 2019/0195789 A1 | 6/2019 | Pan et al. |
| 2019/0204189 A1 | 7/2019 | Mohr, Jr. et al. |
| 2019/0212419 A1 | 7/2019 | Jeong et al. |
| 2019/0220019 A1 | 7/2019 | Tan et al. |
| 2019/0228573 A1 | 7/2019 | Sen et al. |
| 2019/0234868 A1 | 8/2019 | Tanomura et al. |
| 2019/0331652 A1 | 10/2019 | Ba et al. |
| 2020/0050189 A1 | 2/2020 | Gu et al. |
| 2020/0065433 A1 | 2/2020 | Duff et al. |
| 2020/0109976 A1 | 4/2020 | Ajay et al. |
| 2020/0135036 A1 | 4/2020 | Campbell |
| 2020/0182779 A1 | 6/2020 | Kasten et al. |
| 2020/0249092 A1 | 8/2020 | Podmore et al. |
| 2020/0309690 A1 | 10/2020 | Green et al. |
| 2020/0373172 A1 | 11/2020 | Suzuki |
| 2020/0400635 A1 | 12/2020 | Potyrailo et al. |
| 2021/0017926 A1 | 1/2021 | Alkadi et al. |
| 2021/0037197 A1 | 2/2021 | Kester et al. |
| 2021/0055180 A1 | 2/2021 | Thorpe et al. |
| 2021/0109074 A1 | 4/2021 | Smith et al. |
| 2021/0140934 A1 | 5/2021 | Smith et al. |
| 2021/0190745 A1 | 6/2021 | Buckingham et al. |
| 2021/0190918 A1 | 6/2021 | Li et al. |
| 2021/0199565 A1 | 7/2021 | John et al. |
| 2021/0247369 A1 | 8/2021 | Nottrott et al. |
| 2021/0255158 A1 | 8/2021 | Smith et al. |
| 2021/0300591 A1 | 9/2021 | Tian |
| 2021/0321174 A1 | 10/2021 | Sun et al. |
| 2021/0364427 A1 | 11/2021 | Smith et al. |
| 2021/0382475 A1 | 12/2021 | Smith et al. |
| 2022/0082495 A1 | 3/2022 | Kreitinger et al. |
| 2022/0113290 A1 | 4/2022 | Smith et al. |
| 2022/0170810 A1 | 6/2022 | Miller, II et al. |
| 2022/0268952 A1 | 8/2022 | Liang et al. |
| 2022/0341806 A1 | 10/2022 | Miller et al. |
| 2022/0357231 A1 | 11/2022 | Nahata et al. |
| 2023/0194487 A1 | 6/2023 | Buckingham et al. |
| 2023/0213413 A1 | 7/2023 | Mohr, Jr. et al. |
| 2023/0274651 A1 | 8/2023 | McGuire et al. |
| 2023/0392498 A1 | 12/2023 | Srivastav et al. |

FOREIGN PATENT DOCUMENTS

| | | |
|---|---|---|
| CN | 104458588 A | 3/2015 |
| CN | 205749271 U | 11/2016 |
| CN | 106568516 A | 4/2017 |
| CN | 106769977 A | 5/2017 |
| CN | 107703075 A | 2/2018 |
| CN | 109780452 A | 5/2019 |
| CN | 211508182 U | 9/2020 |
| CN | 112213443 A | 1/2021 |
| DE | 29601472 U1 | 5/1996 |
| DE | 69333010 | 4/2004 |
| DE | 102014013822 A1 | 3/2016 |
| EP | 0450809 A2 | 10/1991 |
| EP | 1371962 B1 | 7/2011 |
| EP | 3339855 A1 | 6/2018 |
| FR | 3047073 A1 | 7/2017 |
| FR | 3047073 B1 | 8/2019 |
| GB | 2538563 A | 11/2016 |
| JP | H08247939 A | 9/1996 |
| JP | 200975823 A | 4/2009 |
| KR | 20170062813 A | 6/2017 |
| KR | 101770254 B1 | 8/2017 |
| TW | 522226 B | 3/2003 |
| WO | 1999054700 A2 | 10/1999 |
| WO | 02066950 A1 | 8/2002 |
| WO | 2008021311 A2 | 2/2008 |
| WO | 2015073687 A1 | 5/2015 |
| WO | 2016045791 A1 | 3/2016 |
| WO | 2016162673 A1 | 10/2016 |
| WO | 2017069979 A1 | 4/2017 |
| WO | 2018121478 A1 | 7/2018 |
| WO | 2018227153 A1 | 12/2018 |
| WO | 2019246280 A1 | 12/2019 |
| WO | 2020007684 A1 | 1/2020 |
| WO | 2020028353 A1 | 2/2020 |
| WO | 2020030885 A1 | 2/2020 |
| WO | 2020086499 A1 | 4/2020 |
| WO | 2020206006 A1 | 10/2020 |
| WO | 2020206008 A1 | 10/2020 |
| WO | 2020206020 A1 | 10/2020 |
| WO | 2021055902 A1 | 3/2021 |
| WO | 2021158916 A1 | 8/2021 |
| WO | 2022093864 A1 | 5/2022 |
| WO | 2022211837 A1 | 10/2022 |

OTHER PUBLICATIONS

"SAFESITE Multi-Threat Detection System", Jul. 11, 2012 (Jul. 11, 2012), pp. 1-6, XP055245980.

International Search Report and Written Opinion for PCT/US23/13893, mailed Jun. 30, 2023.

International Search Report and Written Opinion for PCT/US23/23905 mailed Oct. 5, 2023.

Development of a mobile tracer correlation method for assessment of air emissions from landfills and other area sources, Atmospheric Environment 102 (2015) 323-330. T.A. Foster-Wittig et al. 2015.

Measurements of Methane Emissions from Landfills Using a Time Correlation Tracer Method Based on FTIR Absorption Spectroscopy, Environ. Sci. Technol. 2001, 35, 21-25, B. Galle et. al. 2001.

Uehara, K: "Dependence of harmonic signals 1-15 on sample-gas parameters in wavelength-modulation spectroscopy for precise absorption measurements", Applied Physics B, Springer Berlin Heidelberg, Berlin/Heidelberg, vol. 67, Jan. 2, 1998, pp. 517-523, XP007921671, ISSN:0946-2171, DOI: 10.1007/S003400050537.

Lilian Joly, The evolution of AMULSE (Atmospheric Measurements by Ultra-Light Spectrometer) and its interest in atmospheric applications. Results of the Atmospheric Profiles of Greenhouse gasEs (APOGEE) weather balloon release campaign for satellite retrieval validation, p. 1-28, Sep. 25, 2019, Atmospheric Measurement Techniques Discussion (Joly).

U.S. Appl. No. 62/687,147, filed Jun. 19, 2018, Brendan James Smith.

International Search Report and Written Opinion for PCT/US19/38011 mailed Sep. 9, 2019.

International Search Report and Written Opinion for PCT/US19/38015, mailed Oct. 18, 2019.

International Search Report and Written Opinion for PCT/US19/44119, mailed Oct. 17, 2019.

International Search Report and Written Opinion for PCT/US20/26228 mailed Jul. 1, 2020.

International Search Report and Written Opinion for PCT/US20/26232 mailed Jun. 26, 2020.

International Search Report and Written Opinion for PCT/US20/26246 mailed Jun. 29, 2020.

International Search Report and Written Opinion for PCT/US20/51696, mailed Feb. 3, 2021.

International Search Report and Written Opinion for PCT/US2020/044978, mailed Oct. 26, 2020.

International Search Report and Written Opinion for PCT/US2021/016821 mailed Apr. 26, 2021.

International Search Report and Written Opinion for PCT/US2021/024177, mailed Jun. 23, 2021.

International Search Report and Written Opinion for PCT/US2021/056708, mailed Jan. 27, 2022.

International Search Report and Written Opinion for PCT/US21/42061, mailed Nov. 26, 2021.

International Search Report and Written Opinion for PCT/US21/44532, mailed Jan. 11, 2022.

International Search Report and Written Opinion of PCT/US19/57305, mailed Jan. 2, 2020.

(56) References Cited

OTHER PUBLICATIONS

International Search Report and Written Opinion of PCT/US20/54117, mailed Dec. 22, 2020.
Joly, "Atmospheric Measurements by Ultra-Light Spectrometer (AMULSE) Dedicated to Vertical Profile In Situ Measurements of Carbon Dioxide (CO2) Under Weather Balloons: Instrumental Development and Field Application," Sensors 2016, 16, 1609.
Khan, "Low Power Greenhouse Gas Sensors for Unmanned Aerial Vehicles", Remote Snse. 2012, 4, 1355-1368.
Villa. "An Overview of Small Unmanned Aerial Vehicles for Air Quality Measurements: Present Applications and Future Prospectives". Sensors. Web . Jul. 12, 2016.
White, "Development of an Unmanned Aerial Vehicle for the Measurement of Turbulence in the Atmospheric Boundary Layer", Atmosphere, v.8, issue 10, 195, pp. 1-25.
IEEE Conference Paper, "Research of the high pressure jet performance of small size nozzle," ISBN :978-1-5090-1087-5,Publication Date : Oct. 1, 2016, Conference dates Oct. 10, 2016 thru Oct. 12, 2016.[retrieved from the Internet] on Sep. 1, 2023 at 4:14pm.
International Search Report and Written Opinion for PCT/US2023/023933 mailed Sep. 26, 2023.
Cabreira et al. "Survey on Coverage Path Planning with Unmanned Aerial Vehicles", published: Drones, published: Jan. 2019, pp. 1-38, year 2019.
Clilverd, Mark A. et al., Energetic particle injection, acceleration, and loss during the geomagnetic disturbances which upset Galaxy 15, Journal of Geophysical Research, vol. 117, A12213, doi: 10.1029/2012JA018175, 2012, pp. 1-16 (Year:2012).
Kem, Christoph et al., Spatial Distribution of Halogen Oxides in the Plume of Mount Pagan Volcano, Mariana Islands, Geophysical Research Letters 10.1029/2018GL079245, Sep. 27, 2018, pp. 9588-9596 (Year:2018).
Liao, J. et al. Observations of Inorganic bromine(HOBr, BrO, and Br2) speciation at Barrow, Alaska in spring 2009, Journal of Geophysical Research, vol. 117, D00R16, doi:10.1029/2011JD016641, 2012, pp. 1-11 (Year:2012).
Liu, Siwen et al., Development of a UAV-Based System to Monitor Air Quality over an Oil Field, Montana Technological University, Montana tech Library Digital Commons @ Montana Tech Graduate Theses & Non-Theses, Fall 2018, pp. 1-85 (Year:2018).
Miyama, Toru et al., Estimating allowable carbon emission for CO2 concentration stabilization using a GCM-based Earth system model, Geophysical Research Letters, vol. 36,L19709, doi:10.1029/2009GL039678, 2009, pp. 0094-8276 (Year:2009).
Oppenheimer Clive et al., Ultraviolet Sensing of Volcanic Sulfur Emissions, Elements (An Internatioknal Magazine of Mineralogy, Geochemistry, and Petrology), Apr. 2010, vol. 6, pp. 87-92 (Year: 2010).
Parazoo, Nicholas C et al., Interpreting seasonal changes in the carbon balance of southern Amazonia using measurements of XCO2 and chlorophyll fluorescence from GOSAT, Geophysical Research Letters, vol. 40.2829-2833, doi: 10.1002/grl.50452, 2013 pp. 2829-2833 (Year:2013).
Queiber, Manuel et al., A new frontier in CO2 flux measurements using a highly portable DIAL laser system, Scientific Reports, DOI: 10.1038/srep33834 1, Sep. 22, 2016, pp. 1-13(Year:2016).
Queiber, Manuel et al., Large-area quantification of subaerial CO2 anomalies with portable laser remote sensing and 2d tomography, The Leading Edge Mar. 2018, pp. 306-313 (Year:2018).
Feng, Lingbing, Nowak, Gen, O'Neill, T.J., Welsh, A.H."CUTOFF; A spatio-temporal imputation method." Journal of Hydrology 519 (2014) : 3591-3605 (Year:2014).
International Search Report and Written Opinion for PCT/US22/38951, mailed Nov. 28, 2022.
Kelly J F et al. "A capillary absorption spectrometer for stable carbon isotope ratio (C/C) analysis in very small samples", Review of Scientific Instruments, American Institute of Physics, 2 Huntington Quadrangle, Melville, Ny 11747, vol. 83, No. 2, Feb. 1, 2012 (Feb. 1, 2012), pp. 23101-23101, XP012161835, ISSN: 0034-6748, DOI: 10.1063/1.3680593.
Krings et al., Atmos. Meas. Tech., 11, 721-739, Feb. 7, 2018.
International Search Report and Written Opinion for PCT/US21/56710, mailed Feb. 23, 2022.
Day, S., and et al. "Characterisation of regional fluxes of methane in the Surat Basin, Queensland, Phase 1: A review and analysis of literature on methane detection and flux determination." (2013) (Year: 2013).
Field Trial of Methane Emission Quantification Technologies, Society of Petroleum Engineers, SPE-201537-MS, Allen et al., Oct. 2020.
Tao Lei et al:" Low-power, open-path mobile sensing platform for high—resolution measurements of greenhouse gases and air pollutants", Applied Physics B, Springer Berlin Heidelberg, Berlin/Heidelberg, vol. 119, No. 1, Mar. 10, 2015 (Mar. 10, 2015), pp. 153-164, XP035445836, ISSN: 0946-2171, DOI: 10.1007/S00340-015-6069-1 [retrieved on Mar. 10, 2015].
Tarsitano C G et al: Multilaser Herriott Cell for Planetary Tunable Laser Spectrometers', Applied Optics , Optical Society of America, Washington, DC, US, vol. 46, No. 28, Oct. 1, 2007 (Oct. 1, 2007), pp. 6923-6935, XP001508502, ISSN:0003-6935, DOI: 10.1364/AO.46.006923.
Adame J A et al: "Application of cluster analysis to surface ozone, NOand SOdaily patterns in an industrial area in Central-Southern Spain measured with a DOAS system", Science of the Total Environment, Elsevier, Amsterdam, NL, vol. 429, Apr. 11, 2012 (Apr. 11, 2012), pp. 281-291, XP028491183, ISSN: 0048-9697, DOI: 10.1016/J.SCITOTENV.2012.04.032.
Coombes et al, "Optimal Polygon Decomposition for UAV Survey Coverage Path Planning in Wind", published: Jul. 2018, publisher: 'Sensors' (Year:2018).
He et al. "Static Targets' Track Path for UAVs Meeting the Revisit Interval Requirement", published :2013, publisher : IEEE (Year:2013).
Feitz Andrew et al.: "The Ginninderra CH4 and CO2 release experiment: An evaluation of gas detection and quantification techniques", International Journal of Greenhouse Gas Control, Elsevier, Amsterdam, NL, vol. 70, Mar. 15, 2018 (Mar. 15, 2018), pp. 202-224, XP085368237, ISSN: 1750-5836, DOI: 10.1016/J.IJGGC.2017.11.018.
Jensen Morten Bang et al.: "Quantification of greenhouse gas emissions from a biological waste treatment facility", Waste Management, Elsevier, New York, NY, US, vol. 67, May 29, 2017 (May 29, 2017), pp. 375-384, XP085157318, ISSN: 0956-053X, DOI: 10.1016/J.WASMAN.2017.05.033.
Mohn Joachim et al.: "A dual tracer ratio method for comparative emission measurements in an experimental dairy housing", Atmospheric Environment, Elsevier, Amsterdam, NL, vol. 179, Feb. 1, 2018 (Feb. 1, 2018), pp. 12-22, XP085370597, ISSN: 1352-2310, DOI: 10.1016/J.ATMOSENV.2018.01.057.

* cited by examiner

SPECTRAL FITTING OF COMPACT LASER-BASED TRACE GAS SENSOR MEASUREMENTS FOR HIGH DYNAMIC RANGE (HDR)

CROSS-REFERENCE TO RELATED APPLICATION

This application is a 35 U.S.C § 371 National Stage Entry of International Application No. PCT/US2020/051696, filed Sep. 19, 2020, which claims the priority benefit of U.S. Provisional Patent Application Ser. No. 62/903,443, filed Sep. 20, 2019, all of which are hereby incorporated herein by reference in their entirety for all purposes.

FIELD OF ENDEAVOR

Embodiments relate generally to gas detection, and more particularly to gas leak detection and infrastructure inspection

BACKGROUND

Methane (CH4) is an odorless and colorless naturally occurring organic molecule, which is present in the atmosphere at average ambient levels of approximately 1.85 ppm as of 2018 and is projected to continually climb. Methane is a powerful greenhouse gas, a source of energy (i.e., methane is flammable), and an explosion hazard, and so detection of methane is of utility to scientists as well as engineers. While methane is found globally in the atmosphere, a significant amount is collected or "produced" through anthropogenic processes including exploration, extraction, and distribution of petroleum resources as a component in natural gas. Natural gas, an odorless and colorless gas, is a primary fuel used to produce electricity and heat. The main component of natural gas is typically methane, and the concentration of methane in a stream of natural gas can range from about 70% to 90%. The balance of the gas mixture in natural gas consists of longer chain hydrocarbons, including ethane, propane, and butane, typically found in diminishing mole fractions that depend on the geology of the earth from which the gas is extracted. Once extracted from the ground, natural gas is processed into a product that must comply with specifications for both transport, taxation, and end-use in burners; specification of processed 'downstream' natural gas product control for the composition of the gas, so as to protect transport lines from corrosion and ensure proper operation of burners and turbines. While extraction of natural gas is one of the main sources of methane in the atmosphere, major contributors of methane also include livestock farming (i.e., enteric fermentation) and solid waste and wastewater treatment (i.e., anaerobic digestion). Anaerobic digestion and enteric fermentation gas products consist primarily of methane and lack additional hydrocarbon species.

SUMMARY

A method embodiment may include: scanning a laser into wings of an absorption feature; fitting a polynomial to edges of the scan to derive a baseline signal; dividing a transmitted signal by the derived baseline signal to compute a light signal; fitting a spectral model with the computed light signal; and solving for a mole fraction. In additional method embodiments, the wings comprise 10-20 times a full-width half-max (FWHM) of an absorbing line. In additional method embodiments, fitting the polynomial to edges of the scan to derive the baseline further comprises: discarding data within five times the FWHM of the absorbing line. Additional method embodiments further include: deriving a new baseline signal for each scan due to non-ideal perturbations.

In additional method embodiments, solving for the mole fraction further includes: querying a lookup table, where the lookup table comprises a spectral model to interpolate for mole fraction. In additional method embodiments, the lookup table may be based on a spectroscopy model based on a reduced set of parameters.

Another method embodiment may include: characterizing a physical gas sensor in terms of the gas sensor scan and modulation frequencies and any filters that exist in a signal acquisition electronics; applying a lock-in amplifier to the characterized physical gas sensor to simulate harmonic absorption signals; fitting the simulated harmonic absorption signals to acquired data; and solving for a mole fraction left as a free parameter.

In additional method embodiments, the signal acquisition electronics comprise one or more discrete filters. In additional method embodiments, the signal acquisition electronics comprise one or more implicit filters. In additional method embodiments, the lock-in amplifier extracts a signal with a known carrier eave from a noisy environment. In additional method embodiments, the lock-in amplifier comprises one or more low pass filters to reduce electromagnetic (EM) noise. In additional method embodiments, the one or more low pass filters comprise at least one of: an opamp-based active filter, an opamp-based passive filter, and a multipole filter.

Another method embodiment may include: defining a reduced set of parameters from a measurement of a gas sensor; generating a multidimensional lookup table of the reduced set of parameters; loading the multidimensional lookup table onto a sensor processor of the gas sensor; acquiring signals from the sensor; measuring one or more parameters from the acquired signals; and solving for a mole fraction based on plugging measured parameters into the multidimensional lookup table.

In additional method embodiments, the reduced set of parameters includes at least one of: a maximum, a minimum, a distance between peaks, and a full width half maximum. In additional method embodiments, the reduced set of parameters may be taken from a direct absorption signal. In additional method embodiments, the reduced set of parameters may be taken from at least one of: a 2f signal and a 2f/1f signal from a lock-in. In additional method embodiments, the multidimensional lookup table may be generated over a range of expected mole fractions.

A system embodiment may include: a sensor configured to detect incident photons from a trace gas and output a spectrum; a processor having addressable memory, where the processor may be configured to: receive the spectrum from the sensor; fit a polynomial to edges of a scanned laser into wings of an absorption feature to derive a baseline signal; divide a transmitted signal by the derived baseline signal to compute a light signal; fit a spectral model with the computed light signal; and solving for a mole fraction.

In additional system embodiments, the wings comprise 10-20 times a full-width half-max (FWHM) of an absorbing line. In additional system embodiments, the processor may be further configured to: derive a new baseline signal for each scan due to non-ideal perturbations.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

The present embodiments allow for spectral fitting of direct and harmonic detection absorption spectroscopy for an improved dynamic range of sensitivity for gas leak detection. Trace gas sensors are used to detect and quantify leaks of toxic gases, e.g., hydrogen disulfide, or environmentally damaging gases, e.g., methane and sulfur dioxide, in a variety of industrial and environmental contexts. Detection and quantification of these leaks are of interest to a variety of industrial operations, e.g., oil and gas, chemical production, and painting, as well as environmental regulators for assessing compliance and mitigating environmental and safety risks. The performance of trace gas sensors is typically described in terms of sensitivity, i.e., the lowest concentration a sensor can measure and the marginal change in concentration a sensor can measure, and specificity, i.e., how robust the concentration measurement is in a mixture of other gases. Laser-based gas detection techniques are capable of both highly sensitive and specific measurements. Laser-based measurements typically use a laser that emits at a wavelength of light that corresponds to an absorption transition of a chemical species of interest. This light is pitched across an empty space within a solid body, such as a cavity that contains the gas sample. The pitched light can either be at a fixed wavelength or it can be scanned in wavelength. A detector records how much light was transmitted across the cavity. Then, by using the Beer-Lambert relationship, which describes the transmission of light through a sample, i.e., gas in this case, as a function of sample composition and physical properties, e.g., composition, temperature, and pressure, the physical properties of the sample can be inferred. Laser-based trace gas sensors depend heavily on knowledge of the absorption spectrum of a molecule. The absorption spectrum is understood through a quantum-physics-based model that describes the allowable transitions in the energy level of a given molecule. These allowable changes in energy levels correspond to the wavelengths of light the molecule absorbs, and the selection of the energy level transition, or wavelength of light, to use in a trace gas sensor is key to determining the sensitivity and specificity of a sensor.

Figure 1:
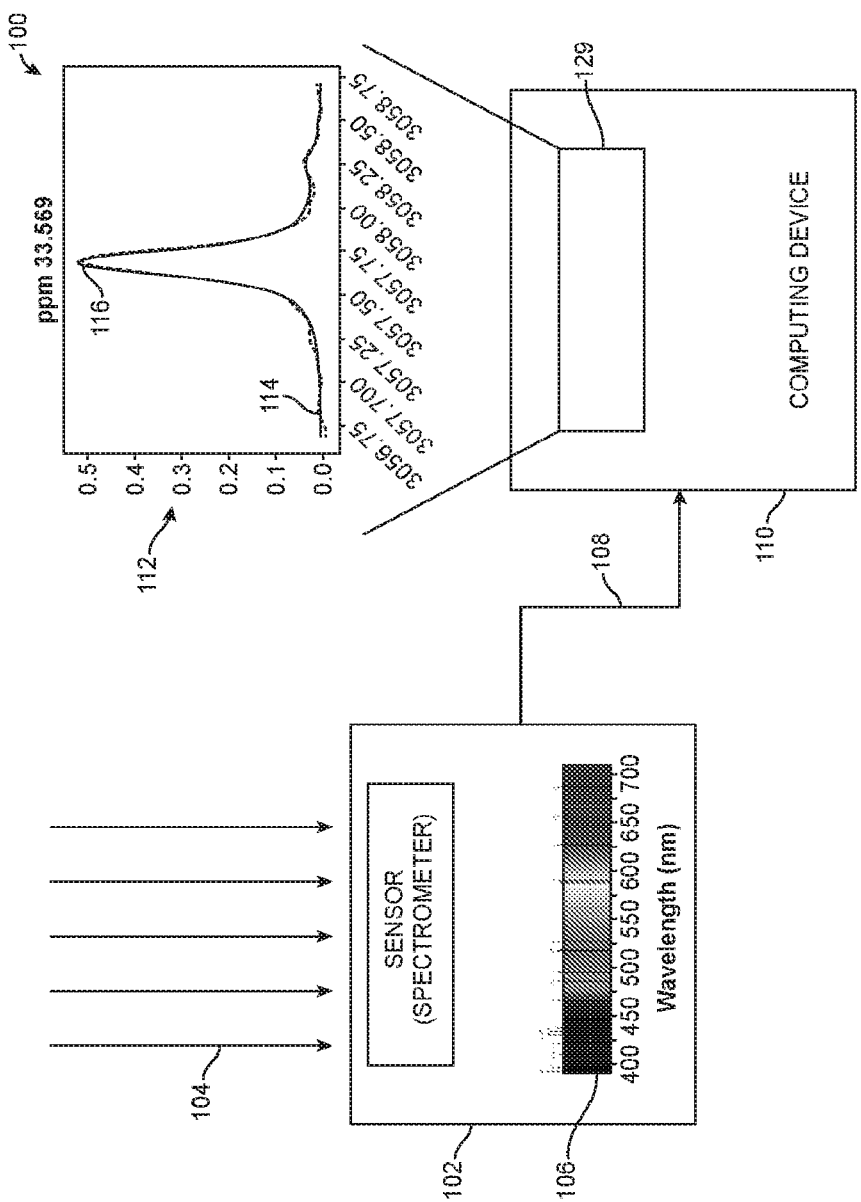
FIG. 1 depicts a system for increasing the dynamic range of sensitivity of an optical absorption spectroscopy-based gas sensor by fitting of direct absorption signals, according to one embodiment.

With respect to FIG. 1, a system 100 for increasing the dynamic range sensitivity of a gas sensor 102 is illustrated. In one embodiment, the sensor 102 is an optical absorption spectroscopy-based gas sensor. The system 100 provides for spectral fitting of direct and harmonic detection absorption spectroscopy for an improved dynamic range of sensitivity for gas leak detection with the sensor 102. Incident photons 104 may be detected at the sensor 102 and may be analyzed spectroscopically for quantifying gas concentrations. Certain applications of leak detection, like detecting a gas that is both toxic in low concentrations and explosive in high concentrations, require that the sensor 102 be capable of accurately quantifying gas concentration over multiple orders of magnitude. Therefore, the sensing application requires a high dynamic range (HDR) of sensitivity.

Generally speaking, the dynamic range may be characterized as the ratio of the maximum possible signal detected by the sensor 102 at a given wavelength or spectral channel of light divided by the baseline noise in the measurement. More specifically, the upper detection limit of a sensor is a function of the number of incident photons 104 received at a cell of the sensor 102; the noise floor, i.e., the sum of all noise sources, of the sensor 102; and the resolution or "bit depth" of the analog-to-digital conversion process. If the path length of the incident photons 104 is very long, the absorbing molecules within constituting the gas will attenuate the light such that no light is detected above the noise floor of the sensor 102. Therefore, a sensor 102 with a very low detection limit will typically be limited in its upper detection limit, limiting the sensor's utility in certain applications.

Figure 2:
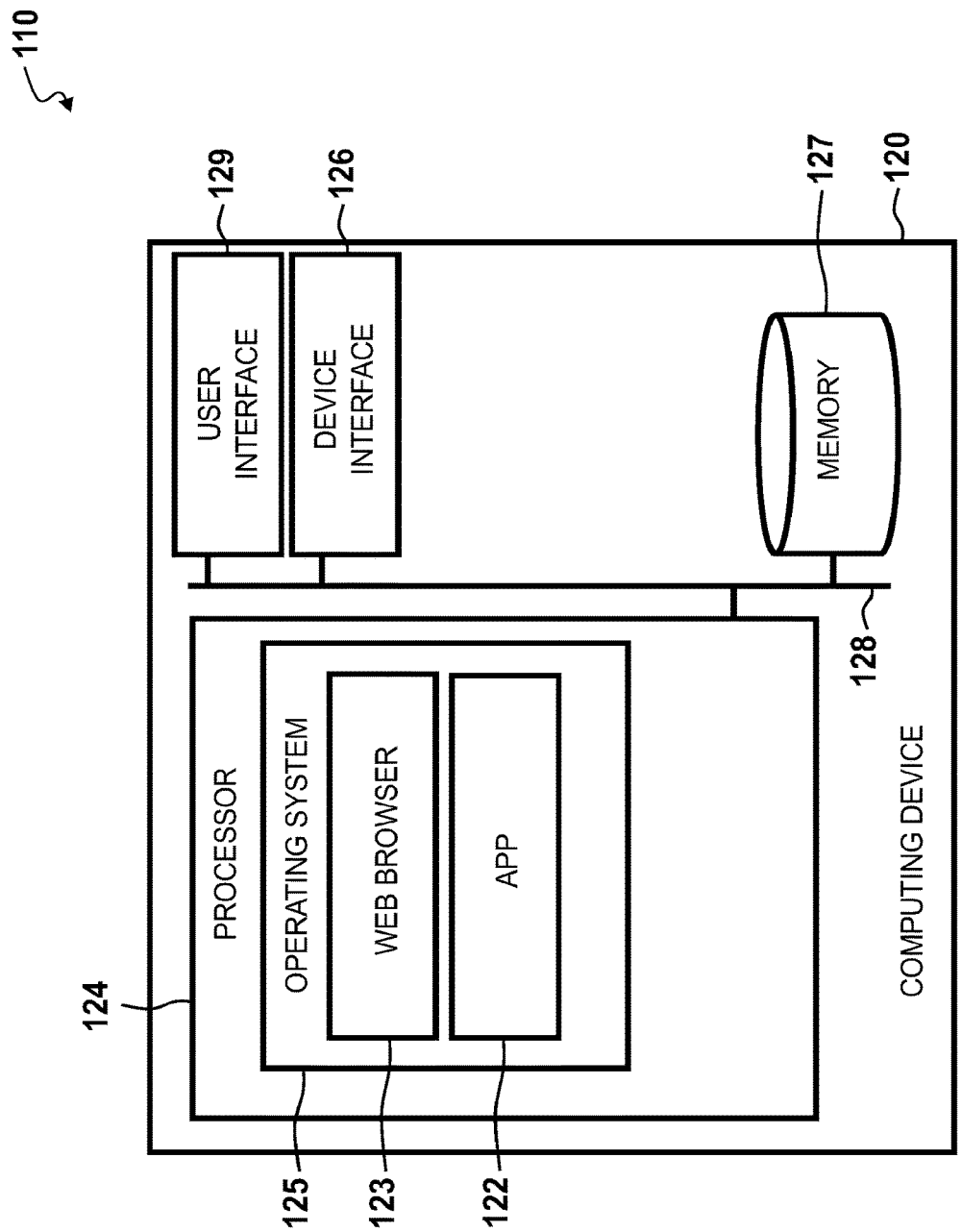
FIG. 2 illustrates an example top-level functional block diagram of a computing device embodiment, according to one embodiment.

FIG. 2 illustrates an example of a top-level functional block diagram of a computing device 110 comprising a processor 124, such as a central processing unit (CPU), addressable memory 127, an external device interface 126, e.g., an optional universal serial bus port and related processing, and/or an Ethernet port and related processing, and an optional user interface 129, e.g., an array of status lights and one or more toggle switches, and/or a display, and/or a keyboard and/or a pointer-mouse system and/or a touch screen. Optionally, the addressable memory may, for example, be: flash memory, eprom, and/or a disk drive or other hard drive. These elements may be in communication with one another via a data bus 128. In some embodiments, via an operating system 125 such as one supporting a web browser 123 and applications 122, the processor 124 may be configured to execute steps of a process establishing a communication channel and processing according to the embodiments described above.

Figure 3A:
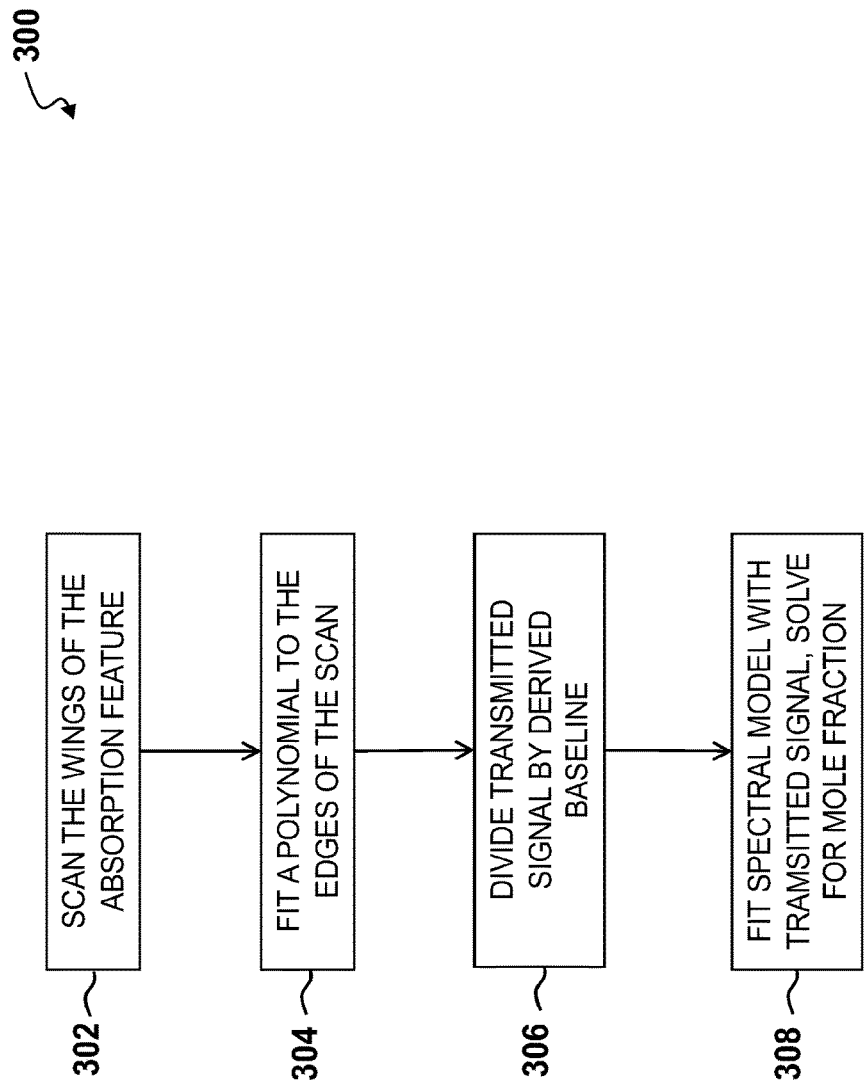
FIG. 3A shows a block flow diagram and process of a system in which an embodiment may be implemented, according to one embodiment.
Figure 3B:
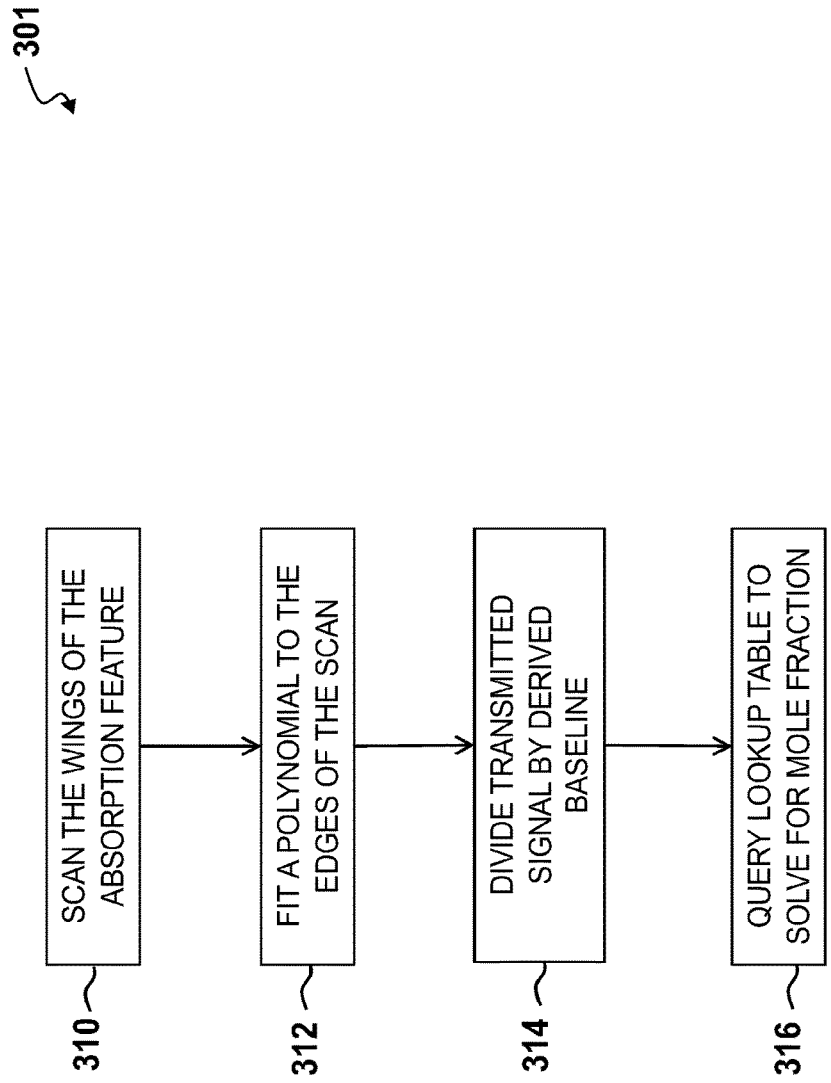
FIG. 3B shows an alternate block flow diagram and process of a system in which an embodiment may be implemented, according to one embodiment.

With respect to FIG. 1, the spectrum 106 detected by the sensor 102 may be transmitted as a digital signal to the computing device 110, such as shown in FIG. 2, by an output 108. The processor 124 may execute steps to analyze and quantify gas concentration of the spectrum 106 over a high dynamic range of sensitivity. In one embodiment, the processor 124 may run an application to fit the acquired data, e.g., the spectrum 106, with a spectroscopic model. In one embodiment, a comparison between the data and a model may be shown on the user interface 129. For example, a diagram 112 may be displayed with the absorbance of incident photons 104 (y-axis) as a function of wavelength (x-axis). The first trace 114, may be a connected trace of actual data. The second trace 116, may be a model fit. Data associated with the spectrum 106 may be plotted with spectroscopic model results over-plotted. In the diagram 112, a plot is shown for measured data versus model. The diagram 112 y-axis is 'absorbance' or the natural log of (I/Io) and it is unitless. The diagram 112 x-axis is 'wavenumber' and may go from 3040 to 3060 and have units of $cm^{-1}$. The diagram 112 displays the end result for a 'direct absorption' fit such as shown in the process of FIGS. 3A-3B. In one embodiment, the spectroscopic model uses gas concentration as a free parameter. More specifically, spectral absorption may be modeled using the Beer-Lambert-Bouguer law. For molecular transitions, the transmission of light can be modeled using the Beer-Lambert-Bouguer law cast in terms of spectral parameters, i.e., line strength, broadening coefficients, wavelength; state variables, i.e., temperature, pressure, mole fraction; and physical parameters, i.e., path length. Molecular absorption lines are modeled as Voigt lines, a convolution of doppler broadened profile (a Gaussian) and a collisionally broadened profile (a Lorentzian). This model can be fit to acquired absorption data, by using measured parameters, e.g., temperature and pressure, known or tabulated parameters, e.g., line strength, and maintaining mole fraction as a free parameter.

In practice, fitting spectral data requires floating additional parameters and applying upper and lower numerical values for those parameters. In a typical tunable laser gas sensor, the laser is scanned in wavelength and intensity over the absorption feature. The absorption is determined by comparing the acquired signal to a baseline signal acquired in the absence of the absorbing species. It may be impossible to eliminate the absorbing species from the interrogation volume. Therefore, a baseline signal must be inferred from the data.

In a direct absorption scheme, such as shown in FIGS. 3A-3B, one needs to evacuate the absorbers ambiently present along the path length before acquiring or fitting a baseline—it's a measurement of Io in Beer's law. The 'beam interrogation volume' is swept by the path traveled by a laser multiplied by the laser beam cross section area. The 'sensor interrogation volume' is defined as the distance between the mirrors multiplied by the area encompassed by the beam spot pattern, which may be approximately the area of a mirror. For either interrogation volume, non-uniformity and accuracy may need to be minimized or reduced.

In some embodiments, non-uniformities in the beam cross section, i.e., any beam that isn't a top hat profile, or non-uniformities along the path may be corrected for. Non-uniformities in the beam cross section as the beam walks across the detector may be corrected by normalizing the acquired signal by a portion of the DA scan or normalizing the acquired signal by the if signal. These corrections may also account for other non-absorbing losses in the cavity, such as scattering.

In some embodiments, non-uniformities along the path of the laser may be corrected by either assuming that the interrogation volume is uniform, or assuming that the acquired absorption-based concentration measurement is a path average of the concentration. In some embodiments, the disclosed system assumes that the acquired absorption-based concentration measurement is a path average.

For the sensor interrogation volume, the same pathlength nonuniformities as described herein above can play a role. In some embodiments, the interrogation volume may be assumed to be uniformly seeded with the absorbing species, or that the measurement is a path average of the absorber. Atmospheric flow may be measured through the 'sensor interrogation volume'—so the length scales of concentration scalars are very large and decrease in size the more turbulent mixing happens. The length scales may be typically much bigger than the interrogation volume, so operating as a point sample is an accurate assumption for the disclosed system and process.

Changes to the beam or volume during baseline fitting, e.g., often when evacuating the cell, may very slightly move the mirrors, which may make the baseline invalid once the cell is no longer under vacuum. Even if a highly accurate baseline fit is not feasible during normal operation, a less than ideal baseline may still work while reducing accuracy, while still providing a desired user accuracy.

In one embodiment, the disclosed system and process may use harmonic detection and a spectral model to get a good handle on the concentration of or effects of background absorbers. Harmonic detection, either 2f/1f or 2f/DA, may normalize out fluctuations in laser intensity and effectively measure the curvature of the lineshape. The disclosed model may also accurately predict lineshape curvature. The combination of 2f/1f with a spectral model may yield a truly calibration free measurement capability, so long as the system is characterized well enough to accurately model it.

With respect to FIG. 3A, a process 300 for applying a spectral absorption model, such as the model described above with the processor 124 of the computing device 110 to spectroscopic data, such as spectrum 106 is illustrated. More specifically, at step 302 a laser may scan far enough into the wings of the absorption feature, i.e., the wings of the convolution of the Gaussian and Lorentzian absorption profiles, that the absorbance is negligible, such as <1%. In one embodiment, the wings comprise approximately 10-20 times the full-width half-max (FWHM) of the absorbing line. At step 304, a polynomial may be fit to the edges of the scan, such that, for example, data that is fit within approximately 5 times the FWHM of the absorber may be discarded in the model. In some embodiments, a polynomial may be fit in the wings of the scan in order to derive a baseline. The fit in the wings may be used to estimate a baseline, and then that baseline may be used to compute the absorption. At step 306, the transmitted signal may be divided by the fit-derived baseline signal to compute the transmission of the light. At step 308, a spectral model can be fit with the transmitted light signal, and the mole fraction can be solved for, as described above. The disclosed process 300 may look for a direct absorption fit.

Non-ideal perturbations, such as dust and vibration may affect the baseline signal, and so a new baseline signal must be computed for each scan. In one embodiment, baseline-fit polynomial coefficients may be incorporated in the spectral model as free parameters. Generally speaking, a poorly-fit baseline signal may result in a nonphysical absorption trace—often manifesting in abnormally fat tails, i.e., too much absorbance in the wings. Floating of the polynomial baseline coefficients, as well as mole fraction, with the spectral model forces a minimization of residuals between acquired data and the spectral model, wherein the spectral model incorporates a scanned laser and also accounts for changes to the laser scan.

Residuals can be used in a few ways in the disclosed system and process. In some embodiments, if all of the residuals are above a certain threshold, then this result may be used to automatically identify if a fit was poor. If the fit is determined to be poor, this measurement may be raised and investigated later, such as by a user. In other embodiments, if residuals only within certain regions around the line are elevated (such as in the wings), then this may suggest that the ambient contains a mixture of gas that wasn't considered in the model. For example, water vapor broadening, i.e., water vapor can cause collisional broadening of spectral lines, may yield excess residuals in the wings of line if the interrogated line is sensitive to water broadening and there is a relatively high concentration of water, and that high concentration of water wasn't included in the spectral model. In other embodiments, if a string of measurements all have relatively high residuals everywhere, then this may be used to trigger a new baseline fit for the scheme detailed in FIGS. 3A-3B.

FIG. 3B shows an alternate block flow diagram and process 301 of a system in which an embodiment may be implemented. The alternate process 301 for applying a spectral absorption model, such as the model described above with the processor 124 of the computing device 110 to spectroscopic data, such as spectrum 106 is illustrated. More specifically, at step 310 a laser may scan far enough into the wings of the absorption feature, i.e., the wings of the convolution of the Gaussian and Lorentzian absorption profiles, that the absorbance is negligible, such as <1%. In one embodiment, the wings comprise approximately 10-20 times the full-width half-max (FWHM) of the absorbing line. At step 312, a polynomial may be fit to the edges of the scan, such that, for example, data that is fit within approximately 5 times the FWHM of the absorber may be discarded in the model. In some embodiments, a polynomial may be fit in the wings of the scan in order to derive a baseline. The fit in the wings may be used to estimate a baseline, and then that baseline may be used to compute the absorption. At step 314, the transmitted signal may be divided by the fit-derived baseline signal to compute the transmission of the light. At step 316, a lookup table can be queried to solve for mole fraction. In some embodiments, the lookup table may be onboard the sensor 102. In other embodiments, the lookup table may be done on another processor, such as a cloud processor and/or via post processing. In some embodiments, a new lookup table may be used based on expected conditions and/or changing conditions. In some embodiments, a lookup table may be queried, where the lookup table is built using a spectral model to interpolate for mole fraction. The built lookup table may be based on a spectroscopy model based on a reduced set of parameters. The lookup table may then be used to derive mole fraction.

Fitting of Harmonic Detection Signals

Figure 4A:
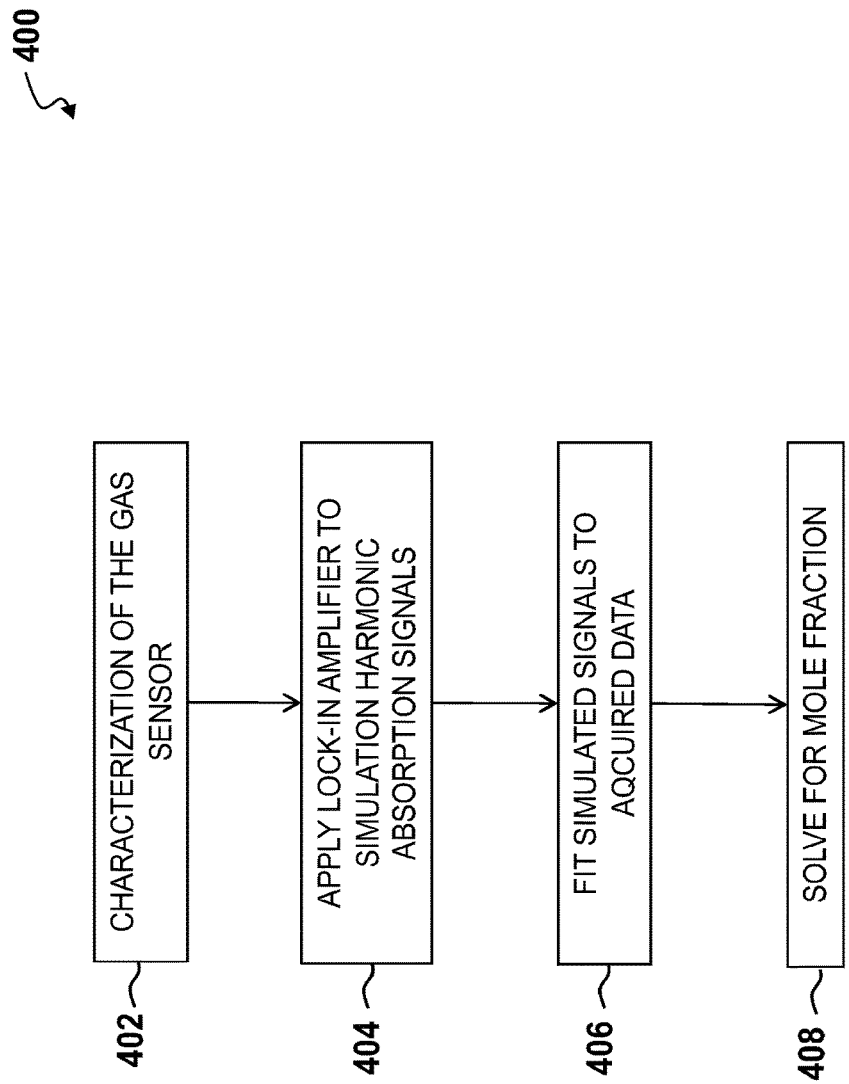
FIG. 4A shows a block flow diagram and process of an alternative system in which an embodiment may be implemented, according to one embodiment.

In another embodiment, and with respect to FIG. 4A, a process 400 for harmonic detection (also known as wavelength modulation spectroscopy) for increasing the dynamic range sensitivity of the sensor 102 is illustrated. The process 400 for harmonic detection may improve laser-absorption-based gas sensor performance in harsh environments, such as environments that are dusty and/or vibration-intense. Similar to the spectral model of processes 300, 301, which may be fit to direct absorption measurements to solve for a mole fraction, the harmonic detection spectral model may also be fit to a harmonic signal.

In wavelength modulation spectroscopy (WMS), linearization, a reduced order model, may be preferred so long as the target range is all optically thin. A simulation/model on the device may be preferred if a monotonic lookup table cannot be constructed using a reduced order model. A lookup table with a reduced order model may be most preferred, in some embodiments.

In direct absorption, linearization may be least preferred in some embodiments where noise sources are present. Noise sources may include vibration, emission, beam steering, and the like. A simulation/model on the device may be preferred if WMS is not possible and/or a reduced order model is not possible. A lookup table with a reduced order model may be preferred in some embodiments where WMS is not possible.

At step 402, the sensor 102 must be accurately characterized in terms of the sensor's 102 scan and modulation frequencies, as well as any filters, e.g., discrete filters or implicit filters, that exist in the signal acquisition electronics. At step 404, a lock-in amplifier may be applied to simulation harmonic absorption signals. The lock-in amplifier may extract a signal with a known carrier wave from an extremely noisy environment. The lock in amplifier may have a low pass filter as the last step in the lock in amplifier. In some embodiments, analog low pass filters may be used on the disclosed circuitry to eliminate EM noise due to digital lines on the boards and/or other radio/EM sources picked up on wiring or the boards themselves. In some embodiments, these low pass filters may be simple capacitor/opamp-based active or passive filters. In other embodiments, these low pass filter may be multipole filters composed of multiple stages with multiple opamps, capacitors, and resistors. At step 406, the simulated signals may be fit to acquired data. At step 408, the mole fraction may be left as a free parameter to be solved for. The cutoff frequency may be the low pass at the end of the low pass. The cutoff sharpness may usually be called out in decibels per octave. The role of this lowpass filter may be to attenuate the information in the signal that is not at the carrier frequency, the modulation rate, or its harmonics. The sharper the cutoff is on this lowpass, the more the noise is attenuated, which may increase the sensitivity of the lock in.

Figure 4B:
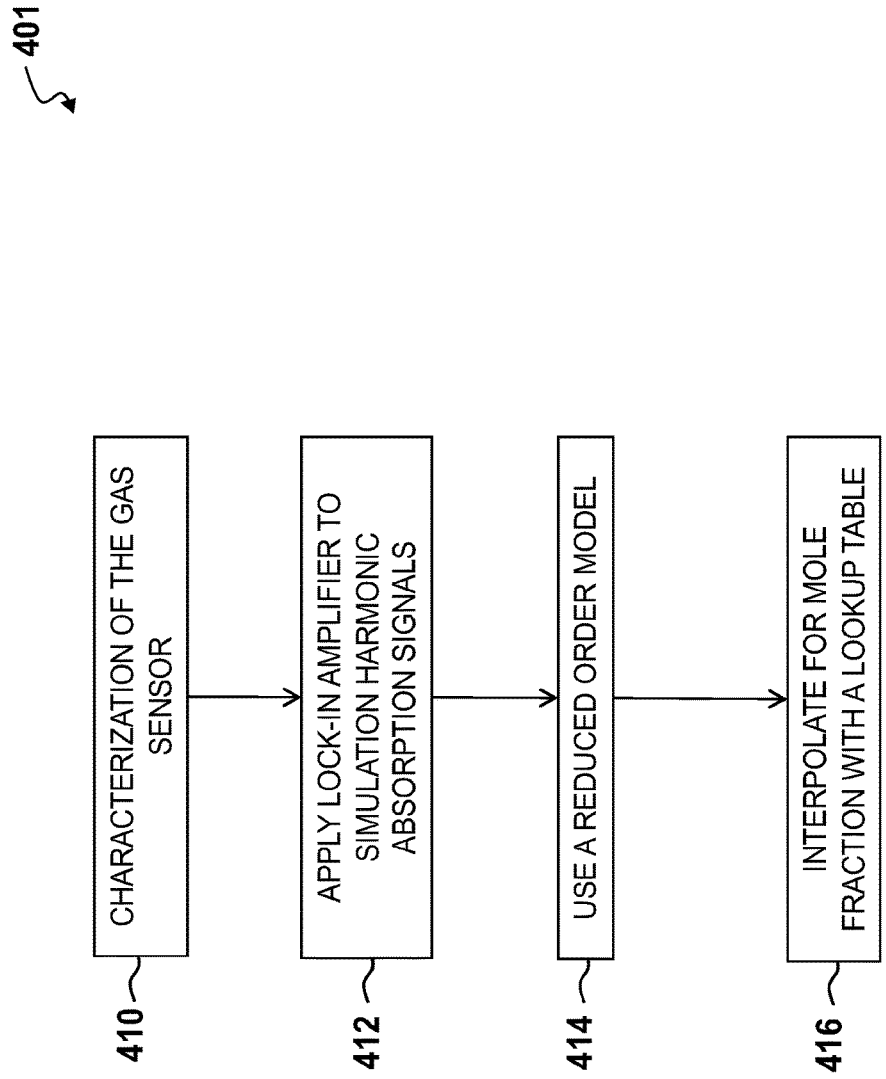
FIG. 4B shows an alternate block flow diagram and process of an alternative system in which an embodiment may be implemented, according to one embodiment.

FIG. 4B shows an alternate block flow diagram and process 401 of an alternative system in which an embodiment may be implemented. In another embodiment, and with respect to FIG. 4B, the process 401 for harmonic detection, also known as wavelength modulation spectroscopy, for increasing the dynamic range sensitivity of the gas sensor 102 is illustrated. The process 401 harmonic detection may improve laser-absorption-based gas sensor performance in harsh environments, such as environments that are dusty and/or vibration-intense. Similar to the spectral model of processes 300, 301, which may be fit to direct absorption measurements to solve for a mole fraction, the harmonic detection spectral model may also be fit to a harmonic signal. At step 410, the sensor 102 must be accurately characterized in terms of the sensor's 102 scan and modulation frequencies, as well as any filters, e.g., discrete filters or implicit filters, that exist in the signal acquisition electronics. At step 412, a lock-in amplifier may be applied to simulation harmonic absorption signals. The lock-in amplifier may extract a signal with a known carrier wave from an extremely noisy environment. The lock in amplifier may have a low pass filter as the last step in the lock in amplifier. In some embodiments, analog low pass filters may be used on the disclosed circuitry to eliminate EM noise due to digital lines on the boards and/or other radio/EM sources picked up on wiring or the boards themselves. In some embodiments, these low pass filters may be simple capacitor/opamp-based active or passive filters. In other embodiments, these low pass filter may be multipole filters composed of multiple stages with multiple opamps, capacitors, and resistors. At step 414, a reduced order model is used. At step 416, the mole fraction is interpolated with a lookup table.

In operation, the signal acquisition and laser characteristics may be inferred by flowing a known gas concentration through the sensor 102 and the spectral model may be fit to the acquired signal with free parameters corresponding to modulation and scan frequencies, as well as filtering cutoff frequencies.

The spectral-fitting embodiments described above may be cast in terms of solving for mole fraction. In other embodiments, multiple parameters may be left free. For example, temperature, pressure, path length, and spectral parameters may be included as free parameters.

Figure 5:
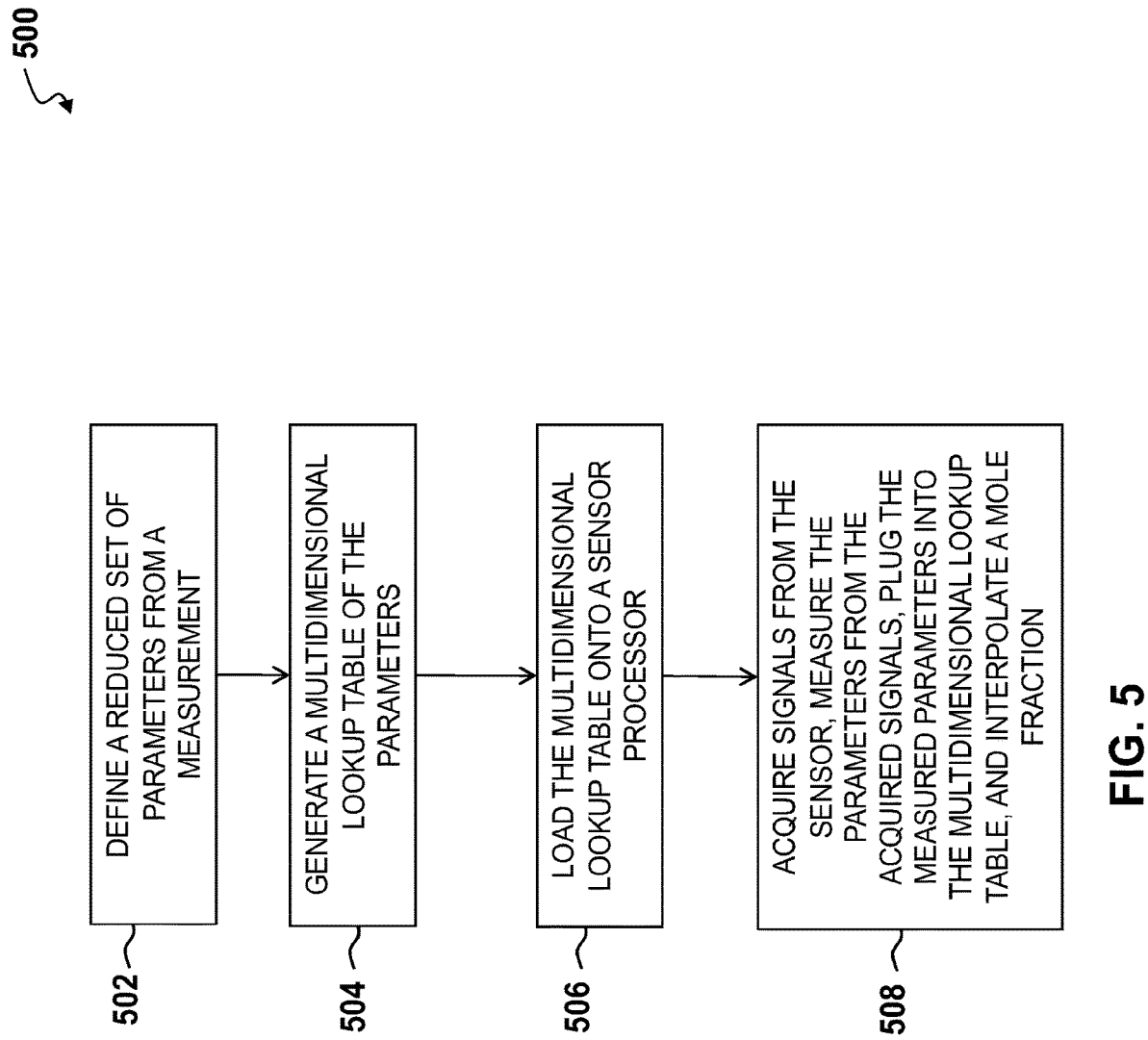
FIG. 5 shows a block flow diagram and process of a system for determining a mole fraction measurement from an acquired detector symbol, according to one embodiment.

FIG. 5 shows a block flow diagram and process 500 of a system for determining a mole fraction measurement from an acquired detector symbol, according to one embodiment. The disclosed process 500 may be used on an embedded system where power and mass constraints are limiting. Instead of using a whole spectral model to fit measurements on the fly, the model disclosed herein may be used to solve a Voigt lineshape for a gas state (mole fractions, T, P). The process 500 may include defining a reduced set of parameters taken from the actual measurement (step 502). These parameters may be max, min, distance between peaks, full width half max, and the like. In some embodiments, these parameters may be taken either from the DA signal. In other embodiments, these parameters may be taken from the 2f or 2f/1f signal from the lock in. The process may then include exercising a spectral model of the system to generate a multidimensional lookup table of the parameters (step 504). This step may be accomplished off device and a priori in some embodiments. The multidimensional lookup table may be generated over the range of T, P, and mole fractions expected to be seen. The process 500 may then include loading the multidimensional lookup table onto the disclosed sensor computer or processor (step 506). The process 500 may then include acquiring the signals, measure the parameters of interest, plugging the measured parameters into the lookup table and interpolating a mole fraction (step 508). The measurements made with the sensor may include the laser, detector, signal, and/or processing circuitry. The parameters of interest may be min, max, or the like.

Figure 6:
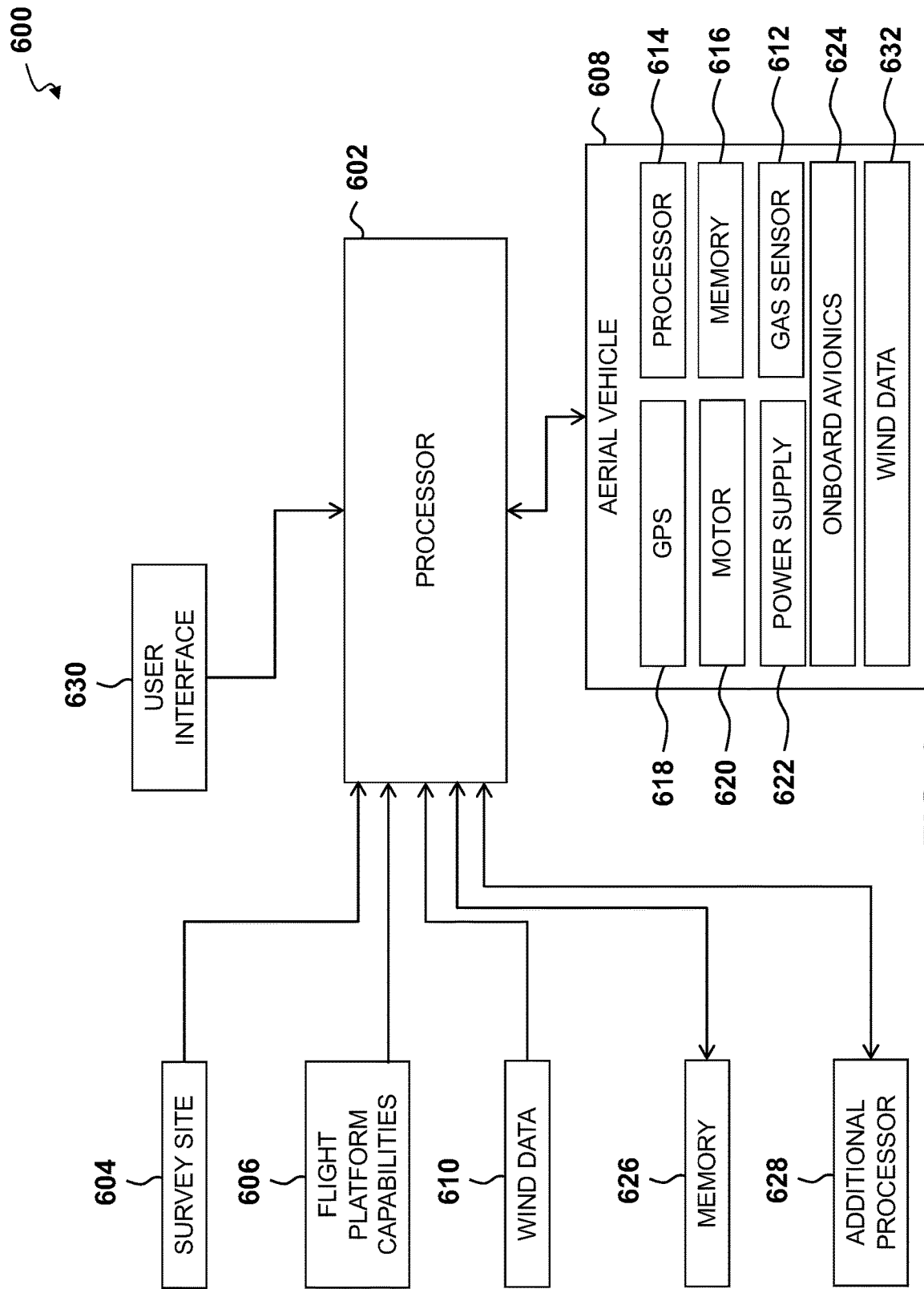
FIG. 6 illustrates an example top-level functional block diagram of an unmanned aerial system (UAS) utilizing the optical absorption spectroscopy-based gas sensor by fitting of direct absorption signals disclosed herein, according to one embodiment.

FIG. 6 illustrates an example top-level functional block diagram of an unmanned aerial system (UAS) 600 utilizing the optical absorption spectroscopy-based gas sensor by fitting of direct absorption signals disclosed herein, according to one embodiment. The system 600 may include a processor 602. The processor 602 may receive information on a survey site 604, which may be an area containing one or more potential gas sources. The one or more potential gas sources may be equipment and/or locations more likely to leak toxic gases, such as hydrogen disulfide, or environmentally damaging gases, such as methane and sulfur dioxide. The survey site 604 information may also include user rules, user preferences, rules, and/or laws relating to the survey site 604. For example, local laws may prohibit an aerial vehicle from being within twenty feet of a pipeline and a user preference may be to remain forty feet away from a pipeline in a survey site.

The processor 602 may also receive flight platform capabilities 606 for an aerial vehicle 608. The flight platform capabilities 606 may include battery capacity, payload limits, maximum flight time, operating restrictions, and the like. The flight platform capabilities 606 may also include a maneuverability of the aerial vehicle 608. For example, a quadrotor type aerial vehicle 608 may be able to hover stop, make acute angle turns, make obtuse angle turns, and make right angle turns. A fixed-wing UAV may be limited to a set turn radius and/or minimum flight speed. The aerial vehicle 608 may be an unmanned aerial vehicle (UAV). The UAV may be autonomous and/or semi-autonomous.

The processor 602 may also receive wind data 610. Wind data 610 may include wind speed and/or wind direction for the survey site 604. In some embodiments, wind data 610 may also include predictions as to changes in the wind speed and/or wind direction.

The processor 602 may determine one or more flight paths, such as shown in FIGS. 2-3D, for the aerial vehicle 608 based on the received survey site 604 information, flight platform capabilities 606, and/or wind data 610. The determined one or more flight paths may create a closed flux plane, such as shown in FIGS. 2-3D, about one or more potential gas sources of the survey site 604.

The aerial vehicle 608 may have at least one gas sensor 612 to generate gas data based on detected gas in the closed flux plane as the aerial vehicle 608 flies the determined one or more flight paths. The aerial vehicle 608 may have a processor 614 in communication with addressable memory 616, a GPS 618, one or more motors 620, and a power supply 622. The aerial vehicle 608 may receive the flight plan from the processor 602 and communicate gathered gas sensor 612 data to the processor 602. The at least one gas sensor 612 may be configured to detect carbon dioxide. In other embodiments, the at least one gas sensor 612 may be configured to detect nitrogen oxide. In other embodiments, the at least one gas sensor 612 may be configured to detect sulfur oxide, such as SO, SO2, SO3, S7O2, S6O2, S2O2, and the like.

The GPS 618 may record the location of the aerial vehicle 608 when each gas sensor 612 data is acquired. The GPS 618 may also allow the aerial vehicle 608 to travel the flight path generated by the processor 602. In some embodiments, the location of the aerial vehicle 608 may be determined by an onboard avionics 624. The onboard avionics 624 may include a triangulation system, a beacon, a spatial coordinate system, or the like. The onboard avionics 624 may be used with the GPS 618 in some embodiments. In other embodiments, the aerial vehicle 608 may use only one of the GPS 618 and the onboard avionics 624. The location information from the GPS 618 and/or onboard avionics 624 may be combined with the gas sensor 612 data to determine if gas is present through the closed flux plane created by the flight plan of the aerial vehicle 608. In some embodiments, wind data 632 may be measured onboard the aerial vehicle 608, such as via a wind sensor mounted to the aerial vehicle 608.

The power supply 622 may be a battery in some embodiments. The power supply 622 may limit the available flight time for the aerial vehicle 608 and so the time- and energy-efficiency flight paths created by the processor 602 allow for the determination as to whether there are any gas leaks through the closed flux plane. In some embodiments, the processor 602 may be a part of the aerial vehicle 608, a cloud computing device, a ground control station (GCS) used to control the aerial vehicle 608, or the like. In some embodiments, a user interface 630 may in communication with the processor 602. The user interface 630 may be used to select the flight path, make changes to the flight path, receive gas data, or the like. In some embodiments, the user interface 630 may be a part of the processor 602, the additional processor 628, and/or a GCS.

The processor 602 may receive gas data from the one or more gas sensors 612 of the aerial vehicle 608. The processor 602 may then determine, based on the received gas data, whether a gas leak is present and/or a rate of the gas leak in the survey site 604. If a gas leak is not detected, no immediate action is needed and further tests may be accomplished in the future to ensure that no gas leaks develop. If a gas leak is detected, then corrective action may be taken to minimize and/or stop the gas leak.

In some embodiments, the processor 602 may be in communication with addressable memory 626. The memory 626 may store the result of whether a gas leak was detected, historical gas data, the flight platform capabilities 606, wind data 610, and/or data from the aerial vehicle 608. In some embodiments, the processor 602 may be in communication with an additional processor 628. The additional processor 628 may be a part of the aerial vehicle 608, a cloud computing device, a GCS used to control the aerial vehicle 608, or the like.

In some embodiments, the one or more processors 602, 614, 628 may be a part of the gas sensor 612. In other embodiments, the one or more processors 602, 614, 628 may be used for post processing. The one or more processors 602, 614, 628 may be used to increase the dynamic range of sensitivity of an optical absorption spectroscopy-based gas sensor by fitting of direct absorption signals as disclosed herein.

Some processing may be completed in real time or near-real time. In other embodiments, processing may be completed after gathering the measurements from the gas sensor 612. While a UAS system 600 is disclosed, handheld embodiments, land vehicle embodiments, and the like are possible and contemplated.

Figure 7:
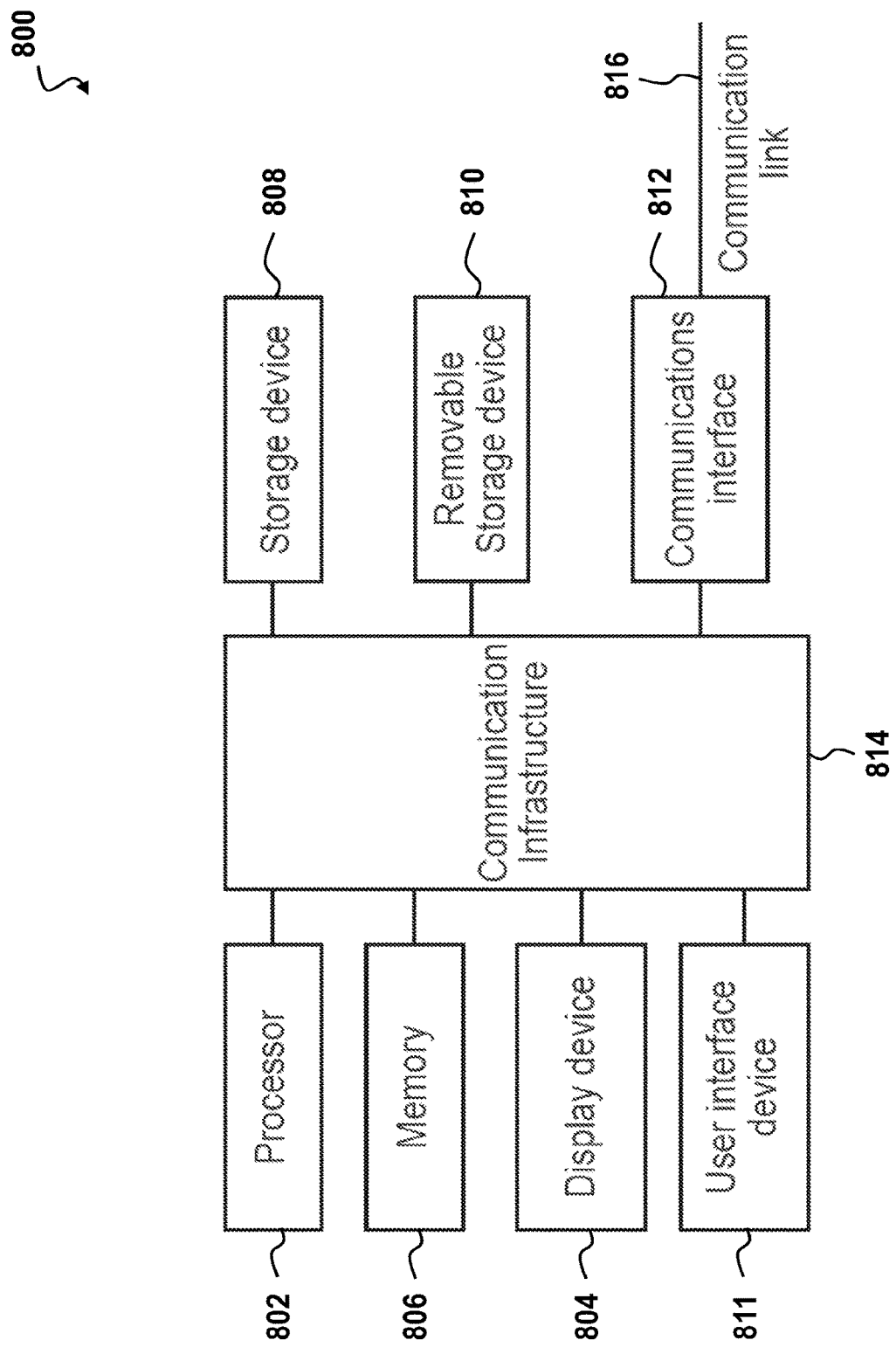
FIG. 7 shows a high-level block diagram and process of a computing system for implementing an embodiment of the system and process.

FIG. 7 is a high-level block diagram 800 showing a computing system comprising a computer system useful for implementing an embodiment of the system and process, disclosed herein. Embodiments of the system may be implemented in different computing environments. The computer system includes one or more processors 802, and can further include an electronic display device 804 (e.g., for displaying graphics, text, and other data), a main memory 806 (e.g., random access memory (RAM)), storage device 808, a removable storage device 810 (e.g., removable storage drive, a removable memory module, a magnetic tape drive, an optical disk drive, a computer readable medium having stored therein computer software and/or data), user interface device 811 (e.g., keyboard, touch screen, keypad, pointing device), and a communication interface 812 (e.g., modem, a network interface (such as an Ethernet card), a communications port, or a PCMCIA slot and card). The communication interface 812 allows software and data to be transferred between the computer system and external devices. The system further includes a communications infrastructure 814 (e.g., a communications bus, cross-over bar, or network) to which the aforementioned devices/modules are connected as shown.

Information transferred via communications interface 814 may be in the form of signals such as electronic, electromagnetic, optical, or other signals capable of being received by communications interface 814, via a communication link 816 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 812. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 8:
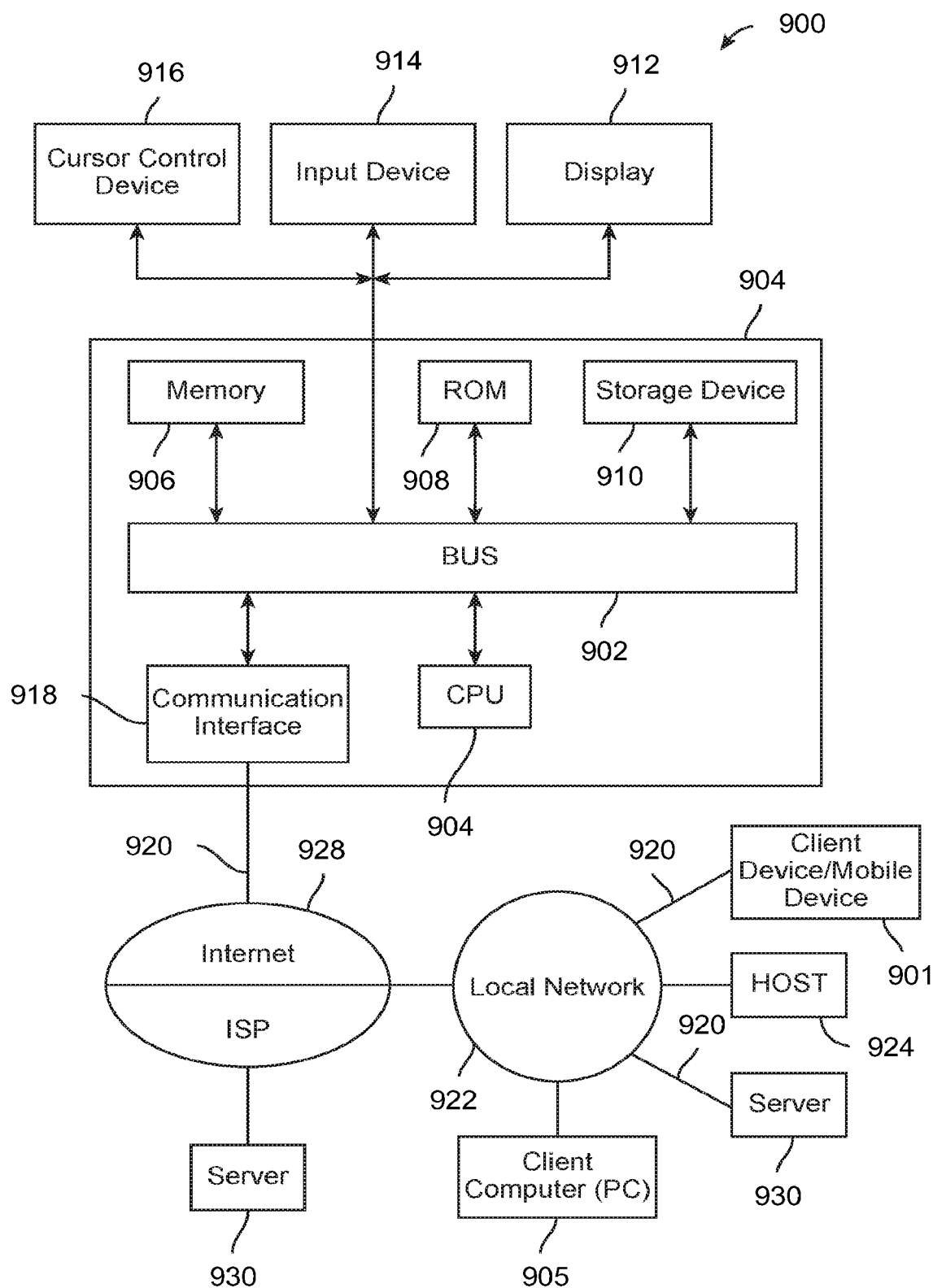
FIG. 8 shows a block diagram and process of an exemplary system in which an embodiment may be implemented.

FIG. 8 shows a block diagram of an example system 900 in which an embodiment may be implemented. The system 900 includes one or more client devices 901 such as consumer electronics devices, connected to one or more server computing systems 930. A server 930 includes a bus 902 or other communication mechanism for communicating information, and a processor (CPU) 904 coupled with the bus 902 for processing information. The server 930 also includes a main memory 906, such as a random access memory (RAM) or other dynamic storage device, coupled to the bus 902 for storing information and instructions to be executed by the processor 904. The main memory 906 also may be used for storing temporary variables or other intermediate information during execution or instructions to be executed by the processor 904. The server computer system 930 further includes a read only memory (ROM) 908 or other static storage device coupled to the bus 902 for storing static information and instructions for the processor 904. A storage device 910, such as a magnetic disk or optical disk, is provided and coupled to the bus 902 for storing information and instructions. The bus 902 may contain, for example, thirty-two address lines for addressing video memory or main memory 906. The bus 902 can also include, for example, a 32-bit data bus for transferring data between and among the components, such as the CPU 904, the main memory 906, video memory and the storage 910. Alternatively, multiplex data/address lines may be used instead of separate data and address lines.

The server 930 may be coupled via the bus 902 to a display 912 for displaying information to a computer user. An input device 914, including alphanumeric and other keys, is coupled to the bus 902 for communicating information and command selections to the processor 904. Another type or user input device comprises cursor control 916, such as a mouse, a trackball, or cursor direction keys for communicating direction information and command selections to the processor 904 and for controlling cursor movement on the display 912.

According to one embodiment, the functions are performed by the processor 904 executing one or more sequences of one or more instructions contained in the main memory 906. Such instructions may be read into the main memory 906 from another computer-readable medium, such as the storage device 910. Execution of the sequences of instructions contained in the main memory 906 causes the processor 904 to perform the process steps described herein. One or more processors in a multi-processing arrangement may also be employed to execute the sequences of instructions contained in the main memory 906. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 904 for execution. Such a medium may take many forms, including but not limited to, non-volatile media, volatile media, and transmission media. Non-volatile media includes, for example, optical or magnetic disks, such as the storage device 910. Volatile media includes dynamic memory, such as the main memory 906. Transmission media includes coaxial cables, copper wire and fiber optics, including the wires that comprise the bus 902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 904 for execution. For example, the instructions may initially be carried on a magnetic disk of a remote computer. The remote computer can load the instructions into its dynamic memory and send the instructions over a telephone line using a modem. A modem local to the server 930 can receive the data on the telephone line and use an infrared transmitter to convert the data to an infrared signal. An infrared detector coupled to the bus 902 can receive the data carried in the infrared signal and place the data on the bus 902. The bus 902 carries the data to the main memory 906, from which the processor 904 retrieves and executes the instructions. The instructions received from the main memory 906 may optionally be stored on the storage device 910 either before or after execution by the processor 904.

The server 930 also includes a communication interface 918 coupled to the bus 902. The communication interface 918 provides a two-way data communication coupling to a network link 920 that is connected to the world wide packet data communication network now commonly referred to as the Internet 928. The Internet 928 uses electrical, electromagnetic or optical signals that carry digital data streams. The signals through the various networks and the signals on the network link 920 and through the communication interface 918, which carry the digital data to and from the server 930, are exemplary forms or carrier waves transporting the information.

In another embodiment of the server 930, interface 918 is connected to a network 922 via a communication link 920. For example, the communication interface 918 may be an integrated services digital network (ISDN) card or a modem to provide a data communication connection to a corresponding type of telephone line, which can comprise part of the network link 920. As another example, the communication interface 918 may be a local area network (LAN) card to provide a data communication connection to a compatible LAN. Wireless links may also be implemented. In any such implementation, the communication interface 918 sends and receives electrical electromagnetic or optical signals that carry digital data streams representing various types of information.

The network link 920 typically provides data communication through one or more networks to other data devices. For example, the network link 920 may provide a connection through the local network 922 to a host computer 924 or to data equipment operated by an Internet Service Provider (ISP). The ISP in turn provides data communication services through the Internet 928. The local network 922 and the Internet 928 both use electrical, electromagnetic or optical signals that carry digital data streams. The signals through the various networks and the signals on the network link 920 and through the communication interface 918, which carry the digital data to and from the server 930, are exemplary forms or carrier waves transporting the information.

The server 930 can send/receive messages and data, including e-mail, program code, through the network, the network link 920 and the communication interface 918. Further, the communication interface 918 can comprise a USB/Tuner and the network link 920 may be an antenna or cable for connecting the server 930 to a cable provider, satellite provider or other terrestrial transmission system for receiving messages, data and program code from another source.

The example versions of the embodiments described herein may be implemented as logical operations in a distributed processing system such as the system 900 including the servers 930. The logical operations of the embodiments may be implemented as a sequence of steps executing in the server 930, and as interconnected machine modules within the system 900. The implementation is a matter of choice and can depend on performance of the system 900 implementing the embodiments. As such, the logical operations constituting said example versions of the embodiments are referred to for e.g., as operations, steps or modules.

Similar to a server 930 described above, a client device 901 can include a processor, memory, storage device, display, input device and communication interface (e.g., e-mail interface) for connecting the client device to the Internet 928, the ISP, or LAN 922, for communication with the servers 930.

The system 900 can further include computers (e.g., personal computers, computing nodes) 905 operating in the same manner as client devices 901, wherein a user can utilize one or more computers 905 to manage data in the server 930.

Figure 9:
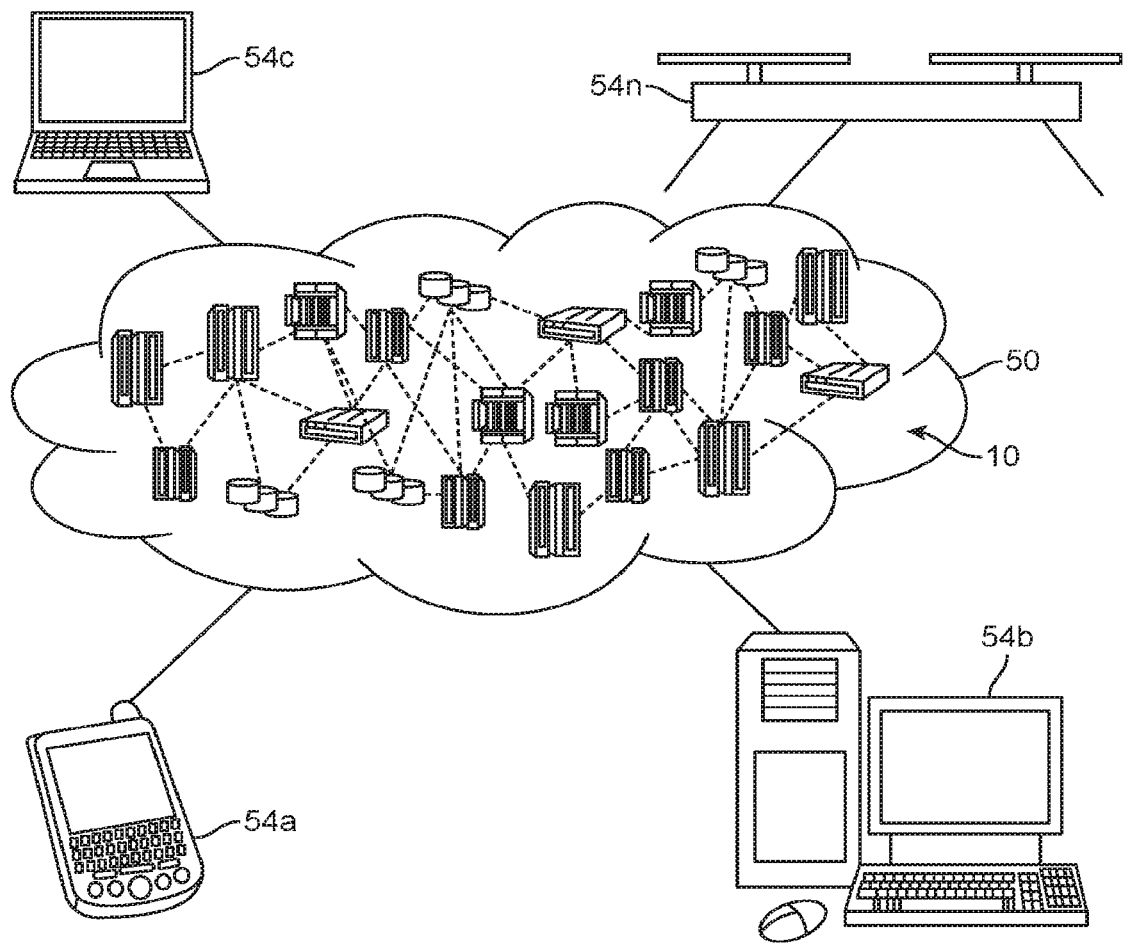
FIG. 9 depicts a cloud-computing environment for implementing an embodiment of the system and process disclosed herein.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or unmanned aerial system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A method comprising:
   collecting, by an optical absorption spectroscopy-based gas sensor mounted on a vehicle, a gas sample from atmosphere of a survey site containing one or more potential gas sources that are likely to leak at least one toxic or environmentally damaging gas;
   detecting, by the optical absorption spectroscopy-based gas sensor, a laser pitched into an optical cavity that contains the gas sample in an environment where non-ideal perturbations including dust and vibration exist, wherein the step of detecting includes:
      scanning, by a wing scanning module of the sensor, the laser into wings of an absorption feature in an absorption profile;
   transmitting, by the sensor in communication with a processor of a computing device, the detected laser to the processor as a digital signal;
   fitting, by a wing based baseline derivation module of the processor, a polynomial to the wings of the scanned laser to derive a baseline signal;
   dividing, by a light computation module of the processor, the transmitted signal by the derived baseline signal to eliminate the non-ideal perturbations from the transmitted signal to compute a light signal;
   fitting, by a spectral model generation module of the processor, a spectral model with the computed light signal;
   displaying, by a user interface of the computing device, a comparison between data of the detected laser and the spectral model;
   solving, by a mole fraction solving module of the processor, for mole fractions of gases in the gas sample based on the fitted spectral model in which effects of the non-ideal perturbations are eliminated; and
   detecting, by the processor, a leak of the at least one toxic gas in the survey site based on each of the mole fractions of the at least one toxic or environmentally damaging gas in the gas sample without the effects of the non-ideal perturbations.

2. The method of claim 1, wherein the wings comprise 10-20 times a full-width half-max (FWHM) of an absorbing line.

3. The method of claim 2, wherein fitting the polynomial to edges of the scan to derive the baseline further comprises:
   discarding data within five times the FWHM of the absorbing line.

4. The method of claim 1, further comprising:
   deriving a new baseline signal for each scan due to non-ideal perturbations.

5. The method of claim 1, wherein solving for the mole fraction further comprises:
   querying, by the processor, a lookup table, wherein the lookup table comprises a spectral model to interpolate for mole fraction.

6. The method of claim 5, wherein the lookup table is based on a spectroscopy model based on a reduced set of parameters.

7. A method comprising:
   collecting, by a physical optical absorption spectroscopy-based gas sensor, a gas sample from atmosphere of a survey site containing one or more potential gas sources that are likely to leak at least one toxic or environmentally damaging gas;
   characterizing a physical optical absorption spectroscopy-based gas sensor in terms of the gas sensor scan and modulation frequencies and any filters that exist in a signal acquisition electronics;

applying a lock-in amplifier to the characterized physical gas sensor to simulate harmonic absorption signals;

fitting, by a spectral model generation module of a processor of a computing device, the simulated harmonic absorption signals to acquired data;

solving, by a mole fraction solving module of the processor for mole fractions of gases in the gas sample left as a free parameter in which effects of the non-ideal perturbations are eliminated; and detecting, by the processor, a leak of the at least one toxic or environmentally damaging gas in the survey site based on each of the mole fractions of the at least one toxic or environmentally damaging gas in the gas sample without the effects of the non-ideal perturbations.

8. The method of claim 7, wherein the signal acquisition electronics comprise one or more discrete filters.

9. The method of claim 7, wherein the signal acquisition electronics comprise one or more implicit filters.

10. The method of claim 7, wherein the lock-in amplifier extracts a signal with a known carrier eave from a noisy environment.

11. The method of claim 7, wherein the lock-in amplifier comprises one or more low pass filters to reduce electromagnetic (EM) noise.

12. The method of claim 11, wherein the one or more low pass filters comprise at least one of: an opamp-based active filter, an opamp-based passive filter, and a multi pole filter.

13. A method comprising:

collecting, by an optical absorption spectroscopy-based gas sensor mounted on a vehicle, a gas sample from atmosphere of a survey site containing one or more potential gas sources that are likely to leak at least one toxic or environmentally damaging gas;

detecting, by the optical absorption spectroscopy-based gas sensor, a laser pitched into an optical cavity that contains the gas sample in an environment where non-ideal perturbations including dust and vibration exist;

defining, by a reduced parameter defining module of a processor of a computing device, a reduced set of parameters from a measurement of the gas sample from the optical absorption spectroscopy-based gas sensor to eliminate effects of the non-ideal perturbations;

generating, by a lookup table generating module of the processor, a multidimensional lookup table of the reduced set of parameters;

loading, by a lookup table loading module of the processor, the multidimensional lookup table onto a sensor processor of the gas sensor;

acquiring, by signal acquiring module of the processor, signals from the sensor;

measuring, by a parameter measuring module of the processor, one or more parameters from the acquired signals;

solving, by a mole fraction solving module of the processor, for mole fractions of gases in the gas sample based on plugging measured parameters into the multidimensional lookup table in which effects of the non-ideal perturbations are eliminated; and detecting, by the processor, leak of the at least one toxic or environmentally damaging gas in the survey site based on each of the mole fractions of the at least one toxic or environmentally damaging gas in the gas sample without the effects of the non-ideal perturbations.

14. The method of claim 13, wherein the reduced set of parameters includes at least one of: a maximum, a minimum, a distance between peaks, and a full width half maximum.

15. The method of claim 13, wherein the reduced set of parameters are taken from a direct absorption signal.

16. The method of claim 13, wherein the reduced set of parameters are taken from at least one of: a 2f signal and a 2f/1f signal from a lock-in.

17. The method of claim 13, wherein the multidimensional lookup table is generated over a range of expected mole fractions.

18. A system comprising:

an optical absorption spectroscopy-based gas sensor configured to detect incident photons from a trace gas of a gas sample in an environment where non-ideal perturbations including dust and vibration exist and output a spectrum, wherein the gas sample is collected from atmosphere of a survey site containing one or more potential gas sources that are likely to leak at least one toxic or environmentally damaging gas;

a processor having addressable memory, wherein the processor is configured to:

receive the spectrum from the sensor;

fit a polynomial to wings of a scanned laser to derive a baseline signal by a wing based baseline derivation module of the processor;

divide a transmitted signal by the derived baseline signal to eliminate the non-ideal perturbations from the transmitted signal to compute a light signal by a light signal computation module of the processor;

fit a spectral model with the computed light signal by a spectral model generation module of the processor;

display a comparison between data of the detected laser and the spectral model by a user interface; and solve for a mole fractions of gases in the gas sample by a mole fraction solving module of the processor; and detect a leak of the at least one toxic gas in the survey site based on each of the mole fractions of the at least one toxic or environmentally damaging gas in the gas sample without the effects of the non-ideal perturbations.

19. The system of claim 18, wherein the wings comprise 10-20 times a full-width half-max (FWHM) of an absorbing line.

20. The system of claim 18, wherein the processor is further configured to:

derive a new baseline signal for each scan due to non-ideal perturbations.

\* \* \* \* \*